US012787061B2

(12) United States Patent
Guo et al.

(10) Patent No.: US 12,787,061 B2
(45) Date of Patent: Nov. 3, 2026

(54) DYNAMIC INDICATION OF CHANNEL OCCUPANCY TIME (COT) INITIATED BY USER EQUIPMENT (UE) OR NETWORK

(71) Applicant: QUALCOMM Incorporated, San Diego, CA (US)

(72) Inventors: Shaozhen Guo, Beijing (CN); Changlong Xu, Beijing (CN); Jing Sun, San Diego, CA (US); Xiaoxia Zhang, San Diego, CA (US); Luanxia Yang, Beijing (CN); Siyi Chen, Beijing (CN)

(73) Assignee: QUALCOMM Incorporated, San Diego, CA (US)

( * ) Notice: Subject to any disclaimer, the term of this patent is extended or adjusted under 35 U.S.C. 154(b) by 328 days.

(21) Appl. No.: 18/559,706

(22) PCT Filed: Mar. 24, 2022

(86) PCT No.: PCT/CN2022/082702
§ 371 (c)(1),
(2) Date: Nov. 8, 2023

(87) PCT Pub. No.: WO2023/010863
PCT Pub. Date: Feb. 9, 2023

(65) Prior Publication Data
US 2024/0244659 A1 Jul. 18, 2024

(30) Foreign Application Priority Data
Jul. 31, 2021 (WO) ................ PCT/CN2021/109930

(51) Int. Cl.
*H04W 74/0808* (2024.01)
*H04W 74/00* (2009.01)

(52) U.S. Cl.
CPC ..... *H04W 74/0808* (2013.01); *H04W 74/006* (2013.01)

(58) Field of Classification Search
CPC ............ H04W 74/0816; H04W 16/14; H04W 72/0453; H04W 76/27; H04W 28/26; H04W 74/0858; H04L 5/0044
See application file for complete search history.

(56) References Cited

U.S. PATENT DOCUMENTS

2020/0280971 A1* 9/2020 Moon ............... H04W 74/0808
2020/0305191 A1* 9/2020 Moon ................... H04W 72/23
(Continued)

FOREIGN PATENT DOCUMENTS

CN 112867156 A 5/2021
WO 2020143057 A1 7/2020
(Continued)

OTHER PUBLICATIONS

Apple Inc: "URLLC Uplink Enhancements for Unlicensed Spectrum", 3GPP TSG RAN WG1 #104bis-e, R1-2103105, e-Meeting, Apr. 12-Apr. 20, 2021, 3rd Generation Partnership Project, Mobile Competence Centre, 650, Route Des Lucioles, F-06921 Sophia-Antipolis Cedex, France, vol. RAN WG1, No. e-Meeting, Apr. 12, 2021-Apr. 20, 2021, Apr. 7, 2021, 14 pages, XP052177906, section 2.2.2, p. 4-p. 5.
(Continued)

*Primary Examiner* — Yee F Lam
(74) *Attorney, Agent, or Firm* — Dinsmore & Shohl LLP

(57) ABSTRACT

Certain aspects of the present disclosure provide techniques for dynamically indicating or determining channel occupancy time (COT) for uplink transmissions. For example, a user equipment (UE) may determine whether a scheduled uplink transmission is based on CE-initiated COT or sharing a network initiated COT (both generally referred to as "COT
(Continued)

types") based on content in the scheduling downlink control information (DCI) or a rule applied for a configured uplink transmission. The present disclosure provides techniques for determining the COT types by using corresponding fields in the DCI when applicable, or when the corresponding fields are absent, by introducing rules configuring the uplink transmission.

30 Claims, 14 Drawing Sheets

(56) References Cited

U.S. PATENT DOCUMENTS

| | | | | |
|---|---|---|---|---|
| 2020/0322982 | A1 | 10/2020 | Wu | |
| 2021/0051718 | A1 | 2/2021 | Bhattad et al. | |
| 2021/0195643 | A1 | 6/2021 | Talarico et al. | |
| 2022/0201753 | A1* | 6/2022 | Zhang | H04W 74/0808 |
| 2024/0260030 | A1* | 8/2024 | Bagheri | H04W 72/1268 |

FOREIGN PATENT DOCUMENTS

| | | | | |
|---|---|---|---|---|
| WO | 2020223732 | A1 | 11/2020 | |
| WO | WO-2021098860 | A1 * | 5/2021 | H04W 74/0875 |
| WO | 2021147062 | A1 | 7/2021 | |
| WO | WO-2022234549 | A1 * | 11/2022 | H04W 72/1268 |

OTHER PUBLICATIONS

Moderator (Ericsson): "Summary#5—Enhancements for IIOT/URLLC on Unlicensed Band", 3GPP TSG-RAN WG1 Meeting #105-e, Tdoc R1-2106048, E-meeting, May 10-27, 2021, 3rd Generation Partnership Project, Mobile Competence Centre, 650, Route Des Lucioles, F-06921 Sophia-Antipolis Cedex, France, vol. RAN WG1, No. E-meeting, May 10, 2021-May 27, 2021, May 27, 2021, 62 pages, XP052015710, section 1, p. 2, section 2.3, p. 28-p. 45.

Sharp: "Enhancements for unlicensed band URLLC/IIoT", 3GPP TSG RAN WGI#105-e, R1-2105632, e-Meeting, May 19-May 27, 2021, 3rd Generation Partnership Project, Mobile Competence Centre, 650, Route Des Lucioles, F-06921 Sophia-Antipolis Cedex, France, vol. RAN WG1, No. e-Meeting, May 19, 2021-May 27, 2021, May 12, 2021, 6 pages, XP052011587, section 2.2, p. 2.

Supplementary European Search Report—EP228515888—Search Authority—The Hague—Apr. 16, 2025.

Ericsson: "Summary#1- Enhancements for IIOT/URLLC on Unlicensed Band", 3GPP TSG-RAN WG1 Meeting #105-e, Tdoc R1-2106044, E-meeting, May 10-27, 2021, Section2.3.1, pp. 1-26.

Ericsson: "Summary#4—Enhancements for IIOT/URLLC on Unlicensed Band", 3GPP TSG-RAN WG1 Meeting #105-e, Tdoc R1-2106047, E-meeting, May 10-27, 2021, Sections 1, 2.2, 5.1.2, pp. 1-58.

Ericsson: "Summary#5—Enhancements for IIOT/URLLC on Unlicensed Band", 3GPP TSG-RAN WG1 Meeting #105-e, Tdoc R1-2106048, E-meeting, May 10-27, 2021, Sections 1, 2.2, 5.1.2, pp. 1-62.

International Search Report and Written Opinion—PCT/CN2021/109930—ISA/EPO—Apr. 25, 2022.

International Search Report and Written Opinion—PCT/CN2022/082702—ISA/EPO—Apr. 29, 2022.

OPPO: "Discussion on the Remaining Issues of Charmel Access Procedure", 3GPP TSG RAN WG1 #101-E, R1-2004085, Jun. 5, 2020(Jun. 5, 2020), 7 Pages, the whole document.

ZTE., et al., "Remaining Issues on the Channel Access Procedure for NR-U", 3GPP TSG RAN WG1 #100b, R1-2001705, Apr. 30, 2020(Apr. 30, 2020), pp. 1-15, the whole document.

* cited by examiner

DYNAMIC INDICATION OF CHANNEL OCCUPANCY TIME (COT) INITIATED BY USER EQUIPMENT (UE) OR NETWORK

CROSS-REFERENCE TO RELATED APPLICATIONS

This application is a national stage application under 35 U.S.C. 371 of PCT/CN2022/082702, filed Mar. 24, 2022, which claims benefit of and priority to PCT Patent Application No. PCT/CN2021/109930, filed Jul. 31, 2021, which are hereby incorporated by reference in their entireties.

Introduction

Aspects of the present disclosure relate to wireless communications, and more particularly, to techniques for dynamically indicating and determining an applicable channel occupancy time (COT) for uplink transmissions.

Wireless communication systems are widely deployed to provide various telecommunication services such as telephony, video, data, messaging, broadcasts, or other similar types of services. These wireless communication systems may employ multiple-access technologies capable of supporting communication with multiple users by sharing available system resources with those users (e.g., bandwidth, transmit power, or other resources). Multiple-access technologies can rely on any of code division, time division, frequency division orthogonal frequency division, single-carrier frequency division, or time division synchronous code division, to name a few. These and other multiple access technologies have been adopted in various telecommunication standards to provide a common protocol that enables different wireless devices to communicate on a municipal, national, regional, and even global level.

Although wireless communication systems have made great technological advancements over many years, challenges still exist. For example, complex and dynamic environments can still attenuate or block signals between wireless transmitters and wireless receivers, undermining various established wireless channel measuring and reporting mechanisms, which are used to manage and optimize the use of finite wireless channel resources. Consequently, there exists a need for further improvements in wireless communications systems to overcome various challenges.

SUMMARY

One aspect provides a method for wireless communications by a user equipment (UE). The method includes receiving from a network entity, a downlink control information (DCI) that schedules at least one uplink transmission from the UE. The method further includes determining, based on an indication in the DCI, whether the at least one uplink transmission is based on a channel occupancy time (COT) initiated by the UE or a COT initiated by the network entity. The method further includes transmitting the at least one uplink transmission in accordance with the determination.

One aspect provides a method for wireless communications by a network entity. The method includes transmitting to a UE, a DCI that schedules at least one uplink transmission from the UE. The method further includes determining, based on an indication in the DCI, whether the at least one uplink transmission is based on a COT initiated by the UE or a COT initiated by the network entity. The method further includes receiving the at least one uplink transmission from the UE in accordance with the determination.

One aspect provides a UE for wireless communications. The UE includes a memory and a processor coupled to the memory. The processor and memory are configured to at least one uplink transmissions from the UE. The processor and memory are further configured to determine, based on an indication in the DCI, whether the at least one uplink transmission is based on a COT initiated by the UE or a COT initiated by the network entity. The processor and memory are further configured to transmit the at least one uplink transmission in accordance with the determination.

One aspect provides a non-transitory computer readable medium storing instructions that when executed by a UE cause the UE to: receive from a network entity, a DCI that schedules at least one uplink transmissions from the UE; determine, based on an indication in the DCI, whether the at least one uplink transmission is based on a COT initiated by the UE or a COT initiated by the network entity; and transmit the at least one uplink transmission in accordance with the determination.

Other aspects provide: an apparatus operable, configured, or otherwise adapted to perform the aforementioned methods as well as those described elsewhere herein; a non-transitory, computer-readable media comprising instructions that, when executed by one or more processors of an apparatus, cause the apparatus to perform the aforementioned methods as well as those described elsewhere herein; a computer program product embodied on a computer-readable storage medium comprising code for performing the aforementioned methods as well as those described elsewhere herein; and an apparatus comprising means for performing the aforementioned methods as well as those described elsewhere herein. By way of example, an apparatus may comprise a processing system, a device with a processing system, or processing systems cooperating over one or more networks.

The following description and the appended figures set forth certain features for purposes of illustration.

BRIEF DESCRIPTION OF THE DRAWINGS

The appended figures depict certain features of the various aspects described herein and are not to be considered limiting of the scope of this disclosure.

DETAILED DESCRIPTION

Figure 1:
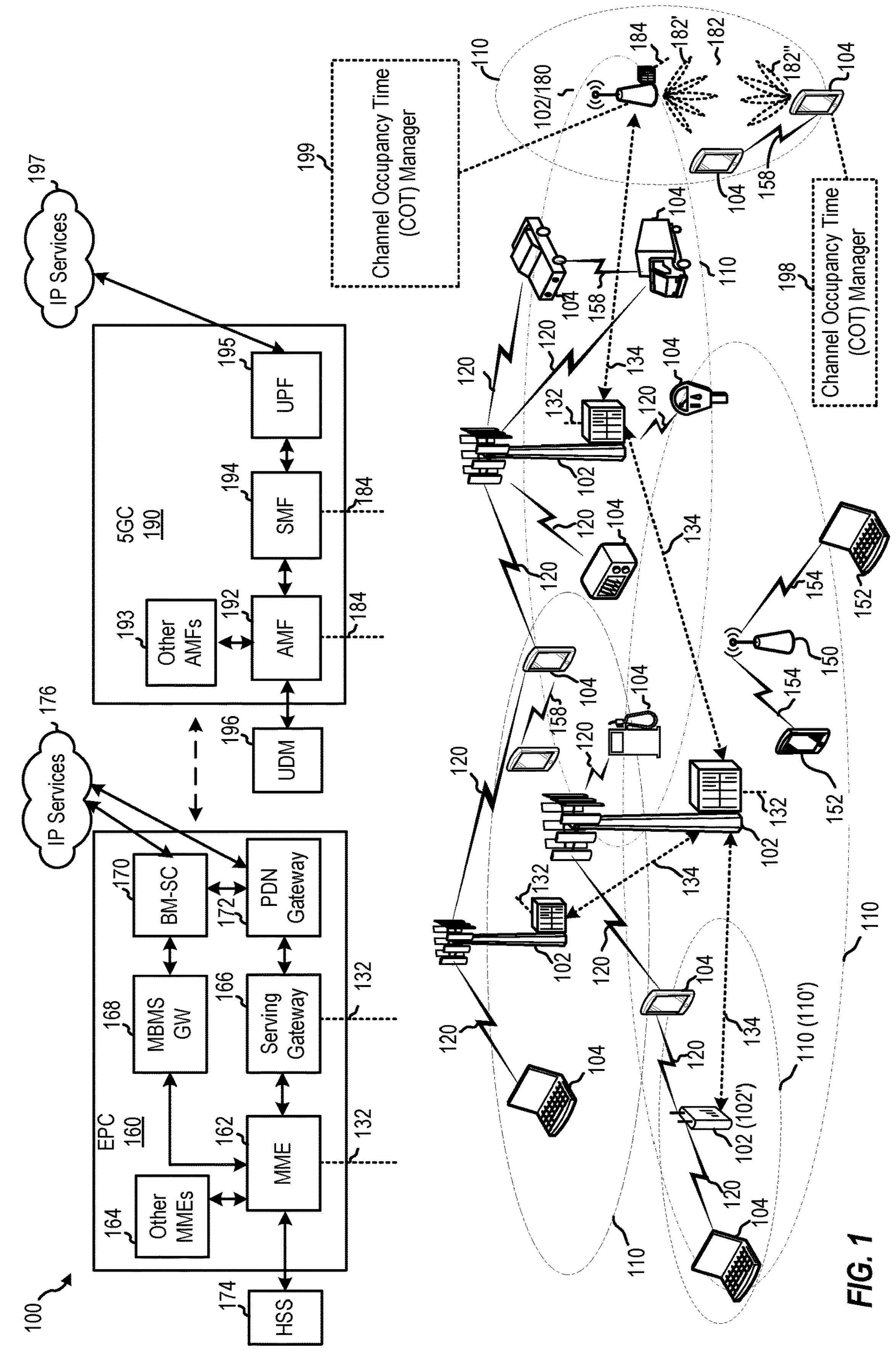
FIG. 1 is a block diagram conceptually illustrating an example wireless communication network.

Aspects of the present disclosure provide apparatuses, methods, processing systems, and computer-readable mediums for dynamically indicating or determining a channel occupancy time (COT) for uplink transmissions. A COT generally refers to a maximum continuous transmission time a device has on a channel after channel sensing. Uplink transmissions may be sent by a user equipment (UE) based on the COT initiated by the UE (e.g., after channel sensing by the UE) or based on a gNodeB (gNB) initiated COT. It may be important for the gNB and the UE to be in agreement on which COT is used, so the UE knows when to send the uplink transmission and so the gNB knows when to expect the transmission.

In some cases, a UE determines whether a scheduled uplink transmission is based on UE-initiated COT or sharing a network initiated COT (both generally referred to as "COT types") based on content in a scheduling downlink control information (DCI) or a rule applied for a configured uplink transmission. The present disclosure provides techniques for determining the COT types by using corresponding fields in the DCI when applicable, or when the corresponding fields are absent, by introducing rules configuring the uplink transmission.

For example, a UE receives from a network entity, a DCI that schedules at least one uplink transmission. The UE determines, based on at least one of an indication in the DCI or a rule, whether the at least one uplink transmission is based on a COT initiated by the UE or a COT initiated by the network entity. The UE then transmits the at least one uplink transmission, in accordance with the determination. In some cases, the indication in the DCI may include a channel access priority class (CAPC) field, a new field if the CAPC field is absent, a priority indicator, a COT initiator indicator field, a field for listen-before-talk (LBT) type indication, and/or another field indicative of the COT types. In some cases, the rule may include a pre-coded set of instructions, a configuration by a radio resource control (RRC), or a rule provided by a media access control (MAC) control element (CE). In some cases, the UE may always initiate the COT for the at least one uplink transmission.

Given the UE may operate as an initiating device, such as in semi-static channel access mode, the UE may determine, based on an indication in the DCI or a rule, whether the at least one uplink transmission is based on a COT initiated by the UE or by the network entity, according to aspects of the present disclosure. In particular, certain DCI formats require new or different signaling for indicating the COT types, as well as in situations where such indication is absent in the DCI (e.g., by applying one or more rules according to certain aspects). According to the present disclosure, existing fields in the DCI may be used, or new fields may be added to extend the DCI's indication abilities. When such DCI fields are absent or not applicable, the present disclosure introduces one or more rules (e.g., by designing signaling between the network and the UE, or configuring uplink transmissions) to determine the COT types for the uplink transmissions.

Introduction to Wireless Communication Networks

FIG. 1 depicts an example of a wireless communications system 100, in which aspects described herein may be implemented.

Generally, wireless communications system 100 includes base stations (BSs) 102, user equipments (UEs) 104, one or more core networks, such as an Evolved Packet Core (EPC) 160 and 5G Core (5GC) network 190, which interoperate to provide wireless communications services.

BSs 102 may provide an access point to the EPC 160 and/or 5GC 190 for a UE 104, and may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, delivery of warning messages, among other functions. BSs may include and/or be referred to as a gNB, NodeB, eNB, ng-eNB (e.g., an eNB that has been enhanced to provide connection to both EPC 160 and 5GC 190), an access point, a base transceiver station, a radio BS, a radio transceiver, or a transceiver function, or a transmission reception point in various contexts.

BSs 102 wirelessly communicate with UEs 104 via communications links 120. Each of BSs 102 may provide communication coverage for a respective geographic coverage area 110, which may overlap in some cases. For example, small cell 102' (e.g., a low-power BS) may have a coverage area 110' that overlaps the coverage area 110 of one or more macrocells (e.g., high-power BSs).

The communication links 120 between BSs 102 and UEs 104 may include uplink (UL) (also referred to as reverse link) transmissions from a UE 104 to a BS 102 and/or downlink (DL) (also referred to as forward link) transmissions from a BS 102 to a UE 104. The communication links 120 may use multiple-input and multiple-output (MIMO) antenna technology, including spatial multiplexing, beamforming, and/or transmit diversity in various aspects.

Examples of UEs 104 include a cellular phone, a smart phone, a session initiation protocol (SIP) phone, a laptop, a personal digital assistant (PDA), a satellite radio, a global positioning system, a multimedia device, a video device, a digital audio player, a camera, a game console, a tablet, a smart device, a wearable device, a vehicle, an electric meter, a gas pump, a large or small kitchen appliance, a healthcare device, an implant, a sensor/actuator, a display, or other similar devices. Some of UEs 104 may be internet of things (IoT) devices (e.g., parking meter, gas pump, toaster, vehicles, heart monitor, or other IoT devices), always on (AON) devices, or edge processing devices. UEs 104 may also be referred to more generally as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, or a client.

Communications using higher frequency bands may have higher path loss and a shorter range compared to lower frequency communications. Accordingly, certain base stations (e.g., 180 in FIG. 1) may utilize beamforming 182 with a UE 104 to improve path loss and range. For example, BS 180 and the UE 104 may each include a plurality of antennas, such as antenna elements, antenna panels, and/or antenna arrays to facilitate the beamforming.

In some cases, BS 180 may transmit a beamformed signal to UE 104 in one or more transmit directions 182'. UE 104 may receive the beamformed signal from the BS 180 in one or more receive directions 182". UE 104 may also transmit a beamformed signal to the BS 180 in one or more transmit directions 182". BS 180 may also receive the beamformed signal from UE 104 in one or more receive directions 182'. BS 180 and UE 104 may then perform beam training to determine the best receive and transmit directions for each of BS 180 and UE 104. Notably, the transmit and receive directions for BS 180 may or may not be the same. Similarly, the transmit and receive directions for UE 104 may or may not be the same.

Wireless communication network 100 includes channel occupancy time (COT) manager 199, which may be configured to determine COT types for uplink transmissions scheduled from a UE 104. For example, the COT manager 199 may perform operations 500 of FIG. 5. Wireless communications network 100 further includes COT manager 198, which may be configured to determine the COT types based on indications of a downlink control information (DCI) or a rule for scheduled uplink transmissions. For example, the COT manager 198 may perform operations 400 of FIG. 4.

Figure 2:
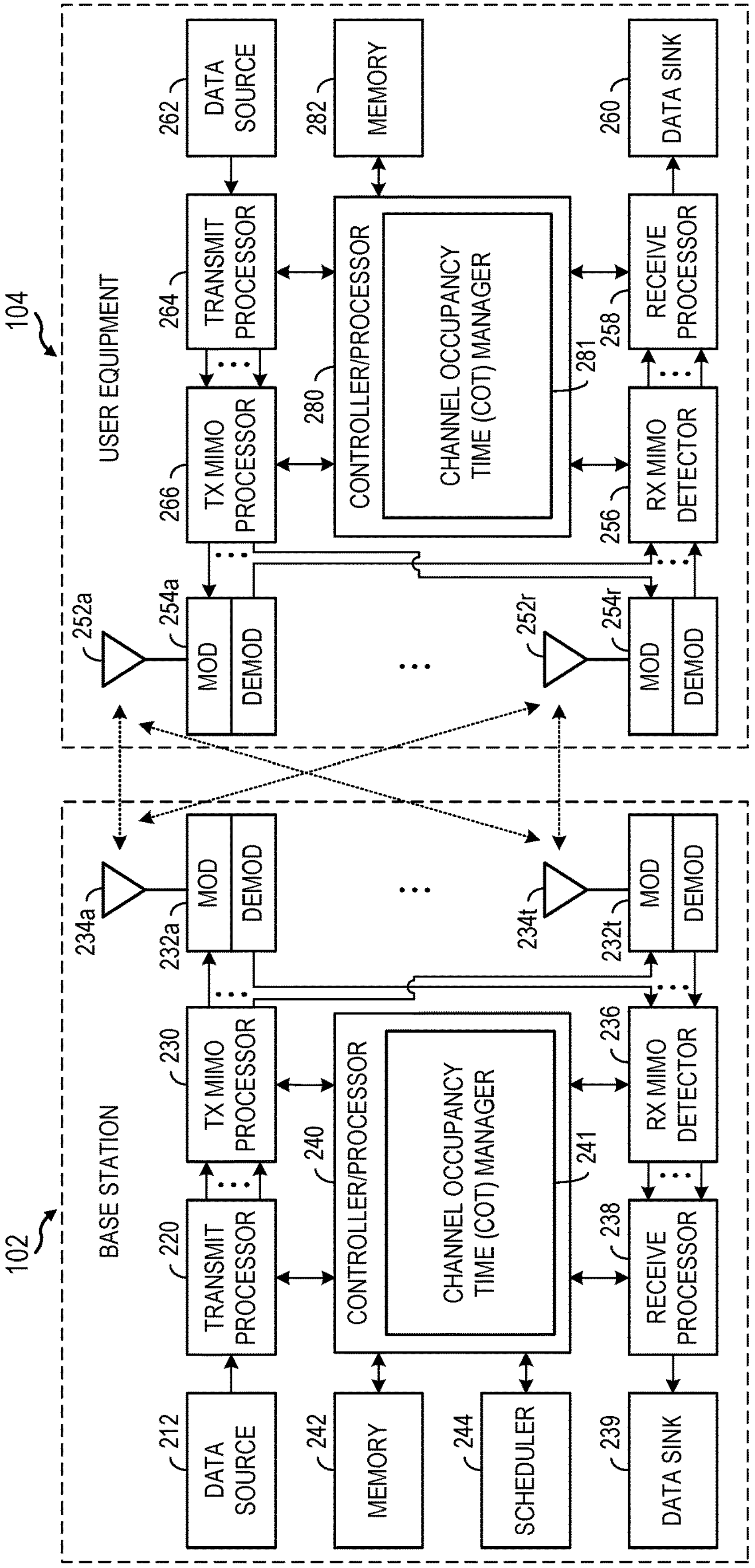
FIG. 2 is a block diagram conceptually illustrating aspects of an example base station (BS) and user equipment (UE).

FIG. 2 depicts aspects of an example (BS 102 and UE 104.

Generally, BS 102 includes various processors (e.g., 220, 230, 238, and 240), antennas 234*a-t* (collectively 234), transceivers 232*a-t* (collectively 232), which include modulators and demodulators, and other aspects, which enable wireless transmission of data (e.g., data source 212) and wireless reception of data (e.g., data sink 239). For example, BS 102 may send and receive data between itself and UE 104.

BS 102 includes controller/processor 240, which may be configured to implement various functions related to wireless communications. In the depicted example, controller/processor 240 includes COT manager 241, which may be representative of COT manager 199 of FIG. 1. Notably, while depicted as an aspect of controller/processor 240, COT manager 241 may be implemented additionally or alternatively in various other aspects of BS 102 in other implementations.

Generally, UE 104 includes various processors (e.g., 258, 264, 266, and 280), antennas 252*a-r* (collectively 252), transceivers 254*a-r* (collectively 254), which include modulators and demodulators, and other aspects, which enable wireless transmission of data (e.g., data source 262) and wireless reception of data (e.g., data sink 260).

UE 104 includes controller/processor 280, which may be configured to implement various functions related to wireless communications. In the depicted example, controller/processor 280 includes COT manager 281, which may be representative of COT manager 198 of FIG. 1. Notably, while depicted as an aspect of controller/processor 280. COT manager 281 may be implemented additionally or alternatively in various other aspects of user equipment 104 in other implementations.

Figures 3A, 3B, 3C, 3D:
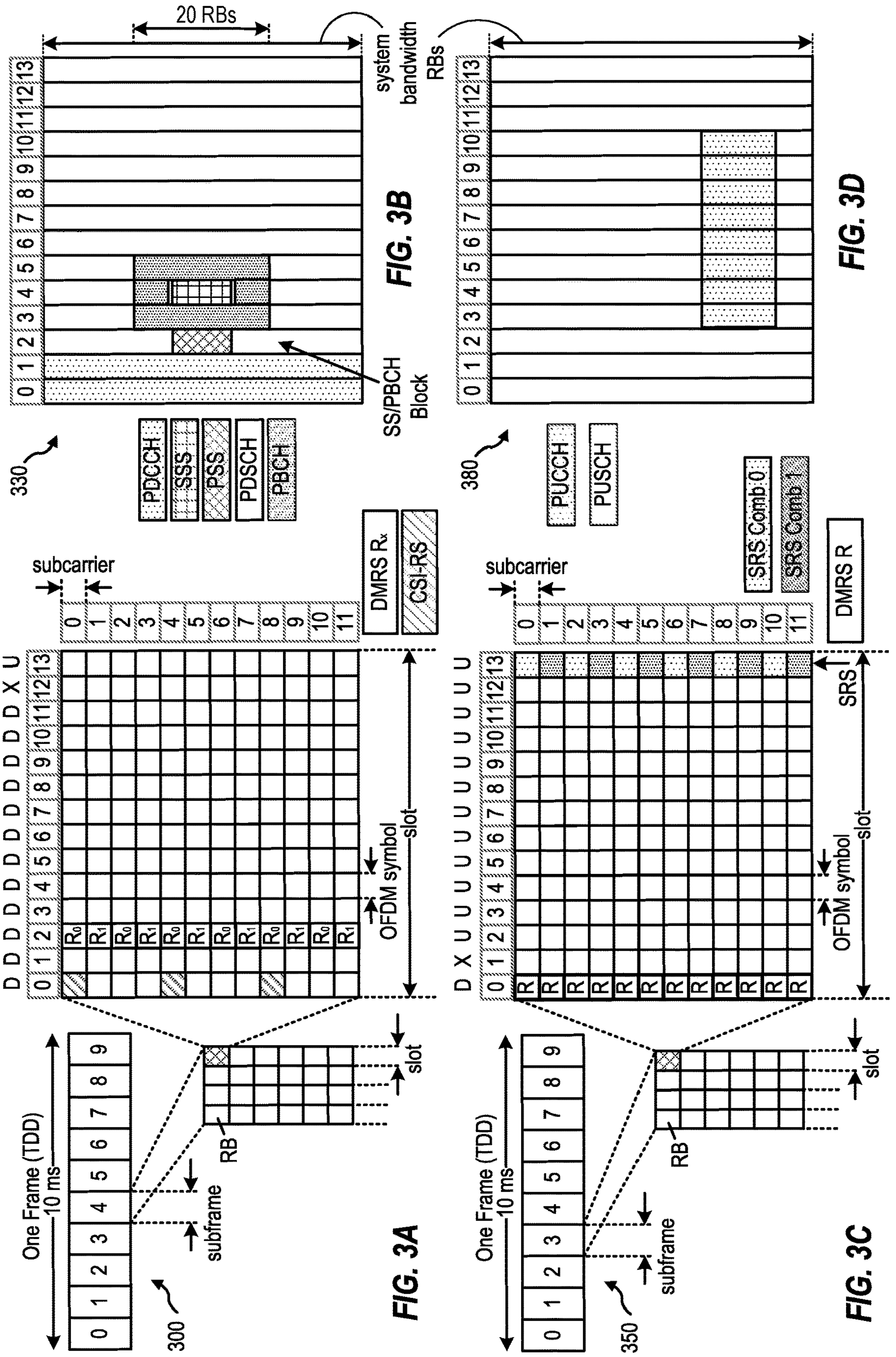
FIGS. 3A-3D depict various example aspects of data structures for a wireless communication network.

FIGS. 3A-3D depict aspects of data structures for a wireless communication network, such as wireless communication network 100 of FIG. 1. In particular, FIG. 3A is a diagram 300 illustrating an example of a first subframe within a 5G (e.g., 5G NR) frame structure, FIG. 3B is a diagram 330 illustrating an example of DL channels within a 5G subframe. FIG. 3C is a diagram 350 illustrating an example of a second subframe within a 5G frame structure, and FIG. 3D is a diagram 380 illustrating an example of UL channels within a 5G subframe.

Further discussions regarding FIG. 1, FIG. 2, and FIGS. 3A-3D are provided later in this disclosure.

Introduction to mmWave Wireless Communications

In wireless communications, an electromagnetic spectrum is often subdivided into various classes, bands, channels, or other features. The subdivision is often provided based on wavelength and frequency, where frequency may also be referred to as a carrier, a subcarrier, a frequency channel, a tone, or a subband.

5G networks may utilize several frequency ranges, which in some cases are defined by a standard, such as the 3GPP standards. For example, 3GPP technical standard TS 38.101 currently defines Frequency Range 1 (FR1) as including 600 MHz-6 GHz, though specific uplink and downlink allocations may fall outside of this general range. Thus, FR1 is often referred to (interchangeably) as a “Sub-6 GHz” band.

Similarly, TS 38.101 currently defines Frequency Range 2 (FR2) as including 26-41 GHz, though again specific uplink and downlink allocations may fall outside of this general range. FR2, is sometimes referred to (interchangeably) as a “millimeter wave” (“mmW” or “mmWave”) band, despite being different from the extremely high frequency (EHF) band (30 GHz-300 GHz) that is identified by the International Telecommunications Union (ITU) as a “millimeter wave” band because wavelengths at these frequencies are between 1 millimeter and 10 millimeters.

Communications using mmWave/near mmWave radio frequency band (e.g., 3 GHz-300 GHz) may have higher path loss and a shorter range compared to lower frequency communications. As described above with respect to FIG. 1, a base station (e.g., 180) configured to communicate using mmWave/near mmWave radio frequency bands may utilize beamforming (e.g., 182) with a UE (e.g., 104) to improve path loss and range.

Further, as described herein, to access shared spectrum channels, channel occupancy time (COT) or COT duration for uplink transmissions need be defined. For example, downlink control information (DCI) format 2_0 may be used to notify a group of user equipments (UEs) of a slot format, available resource block (RB) sets, and the COT duration. In some cases, a DCI (e.g., format 0_0 or 1_0) may include fields indicating combinations of channel access type and cyclic prefix (CP) extension, such as shown in Table 7.3.1.1-4 or Table 7.3.1.1.1.4A of TS 38.212. As such, the COT duration is often configured by a network entity by a higher layer parameter (e.g., ul-AccessConfigListDCI-1-1) for a type of channel access procedure.

In semi-static channel access mode, a UE may operate as an initiating device and initiate its own COT. The UE may thus need to determine whether a scheduled uplink transmission is based on a COT initiated by a network entity (i.e., sharing a gNB-initiated COT) or based on a COT initiated by the UE. At a high level, the determination may be based on content in a scheduling DCI or based on rules applied for a configured uplink transmission. Details of such determination, however, have yet been resolved for situations where corresponding fields for the indication may be absent in the DCI, as well as how to handle situations when the network entity schedules an uplink transmission in a next fixed frame period (FFP) of the network entity. The present disclosure provides various specific signaling solutions or techniques to resolve these situations.

Aspects Related to Channel Occupancy Time (COT) Indication and Determination The present disclosure provides techniques for indicating and determining whether an uplink transmission is based on a channel occupancy time (COT) initiated by a user equipment (UE) or a COT initiated by a network entity. The determination may be made dynamically, when the UE receives updated downlink control information (DCI) scheduling future transmissions or when conditions for applying rules vary. For example, when the UE is operating in a semi-static channel access mode, the UE may operate as an initiating device and may also operate according to initiations by the network entity, as discussed below.

Aspects of the present disclosure may help a UE determine whether a scheduled uplink transmission is to be based on a UE-initiated COT or if the uplink transmission is sent sharing a gNB-initiated COT. In some cases, the determination may be based on the content in the scheduling DCI and/or whether a corresponding field or fields are absent in the DCI. If a field is absent, the determination may be based on the rules applied for configured uplink transmissions.

Aspects of the present disclosure may also allow a UE to determine whether (or how) to handle the case when a gNB schedules an uplink transmission in a subsequent fixed frame period (FFP) of the gNB. In some cases, a determination of what COT (UE-initiated COT or shared gNB COT) to use may be based on the rules applied for a configured uplink transmission.

Figure 4:
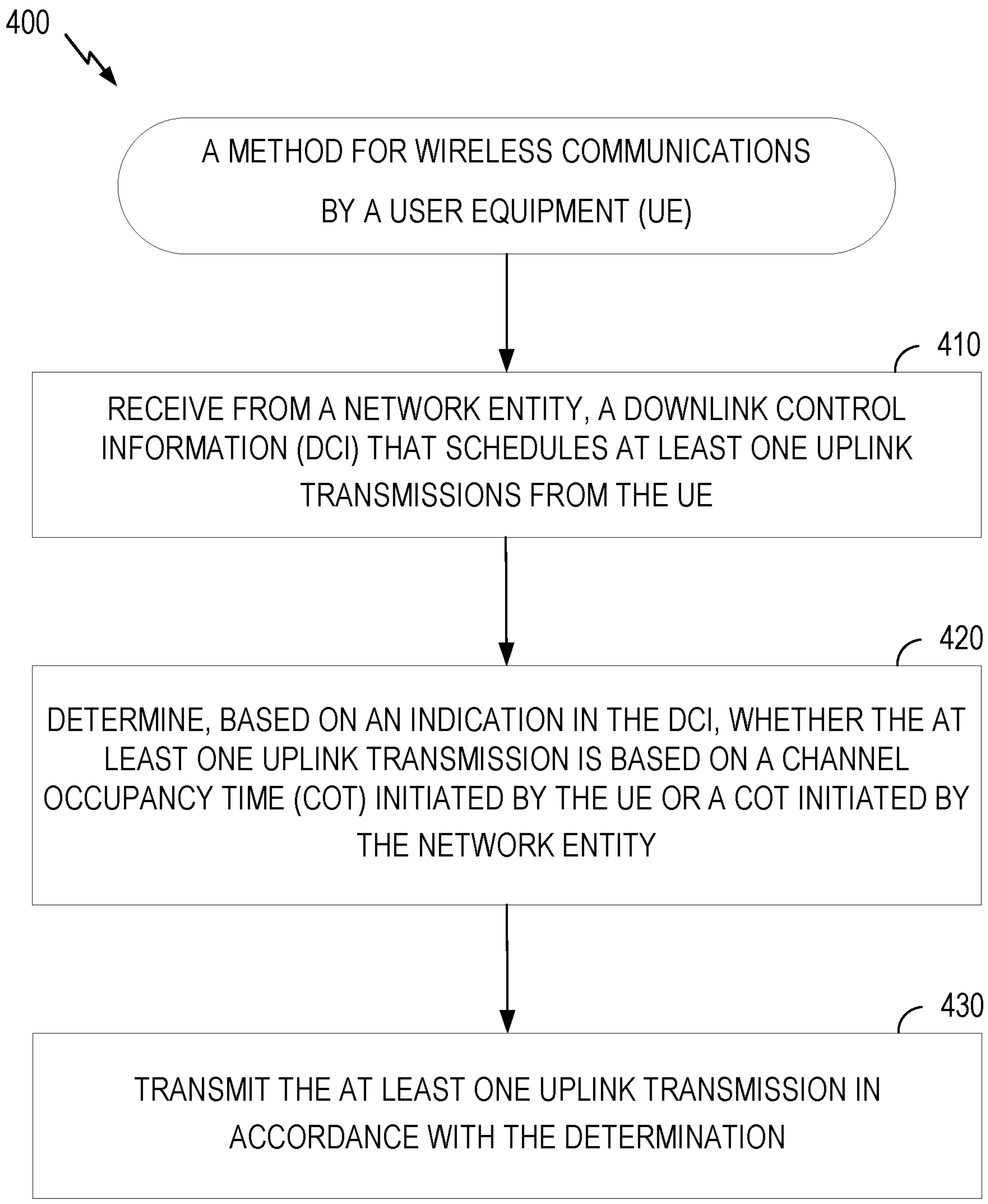
FIG. 4 depicts an example flow diagram for operations by a UE.

FIG. 4 is a flow diagram illustrating example operations 400 for wireless communication. The operations 400 may be performed, for example, by a UE (e.g., such as the UE 104 in the wireless communication network 100 of FIG. 1). The operations 400 may be implemented as software components that are executed and run on one or more processors (e.g., the controller/processor 280 of FIG. 2). Further, transmission and reception of signals by the UE in operations 400 may be enabled, for example, by one or more antennas (e.g., the antennas 252 of FIG. 2). In certain aspects, the transmission and/or reception of signals by the UE may be implemented via a bus interface of one or more processors (e.g., the controller/processor 280) obtaining and/or outputting signals.

The operations 400 begin, at 410, by receiving from a network entity, a DCI that schedules at least one uplink transmission from the UE. For example, the UE receives a DCI from the network entity using antenna(s) and receiver/transceiver components of the UE 104 shown in FIG. 1 or FIG. 2 and/or of the apparatus shown in FIG. 13.

At 420, the UE determines, based on an indication in the DCI, whether the at least one uplink transmission is based on a COT initiated by the UE or a COT initiated by the network entity. For example, the UE may perform the determination using the COT manager 281 of the controller/processor 280, and/or the coupled transmit processor 264 or the receive processor 258 shown in FIG. 2 and/or of the apparatus shown in FIG. 13.

At 430, the UE transmits the at least one uplink transmission in accordance with the determination. For example, the UE transmits the at least one uplink transmission to the network entity using antenna(s) and transmitter/transceiver components of the UE 104 shown in FIG. 1 or FIG. 2 and/or of the apparatus shown in FIG. 13.

Figure 5:
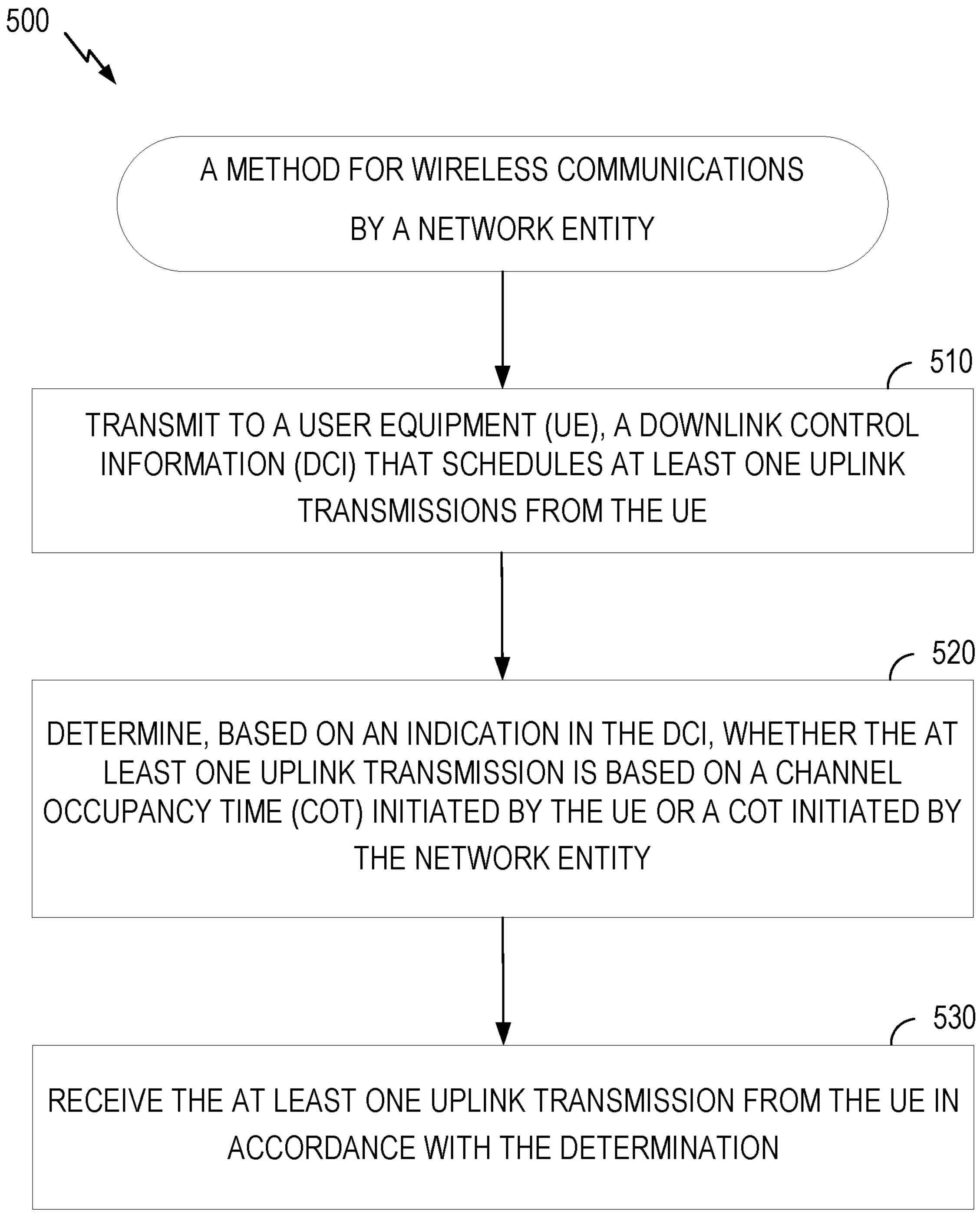
FIG. 5 depicts an example flow diagram for operations by a network entity.

FIG. 5 depicts a flow diagram illustrating example operations 500 for wireless communication. The operations 500 may be performed, for example, by a network entity (e.g., such as the BS 102 in the wireless communication network 100 of FIG. 1). The operations 500 performed by the network entity may be complimentary to the operations 400 performed by the UE. The operations 500 may be implemented as software components that are executed and run on one or more processors (e.g., the controller/processor 240 of FIG. 2). Further, transmission and reception of signals by the network entity in operations 500 may be enabled, for example, by one or more antennas (e.g., the antennas 234 of FIG. 2). In certain aspects, the transmission and/or reception of signals by the network entity may be implemented via a bus interface of one or more processors (e.g., the controller/processor 240) obtaining and/or outputting signals.

The operations 500 begin, at 510, by transmitting to a UE, a DCI that schedules at least one uplink transmission from the UE. The DCI may include various DCI formats. For example, the network entity may transmit the DCI to the UE using antenna(s) and transmitter/transceiver components of the BS 102 shown in FIG. 1 or FIG. 2 and/or of the apparatus shown in FIG. 14.

At 520, the network entity determines, based on an indication in the DCI, whether the at least one uplink transmission is based on a COT initiated by the UE or a COT initiated by the network entity. For example, the network entity may determine whether the at least one uplink transmission is based on a COT initiated by the UE or a COT initiated by the network entity, using a processor of the BS 102 shown in FIG. 1 or FIG. 2 and/or of the apparatus shown in FIG. 14.

At 530, the network entity receives the at least one uplink transmission from the UE in accordance with the determination. For example, the network entity may receive the at least one uplink transmission from the UE using antenna(s) and receiver/transceiver components of the BS 102 shown in FIG. 1 or FIG. 2 and/or of the apparatus shown in FIG. 14.

Figure 6:
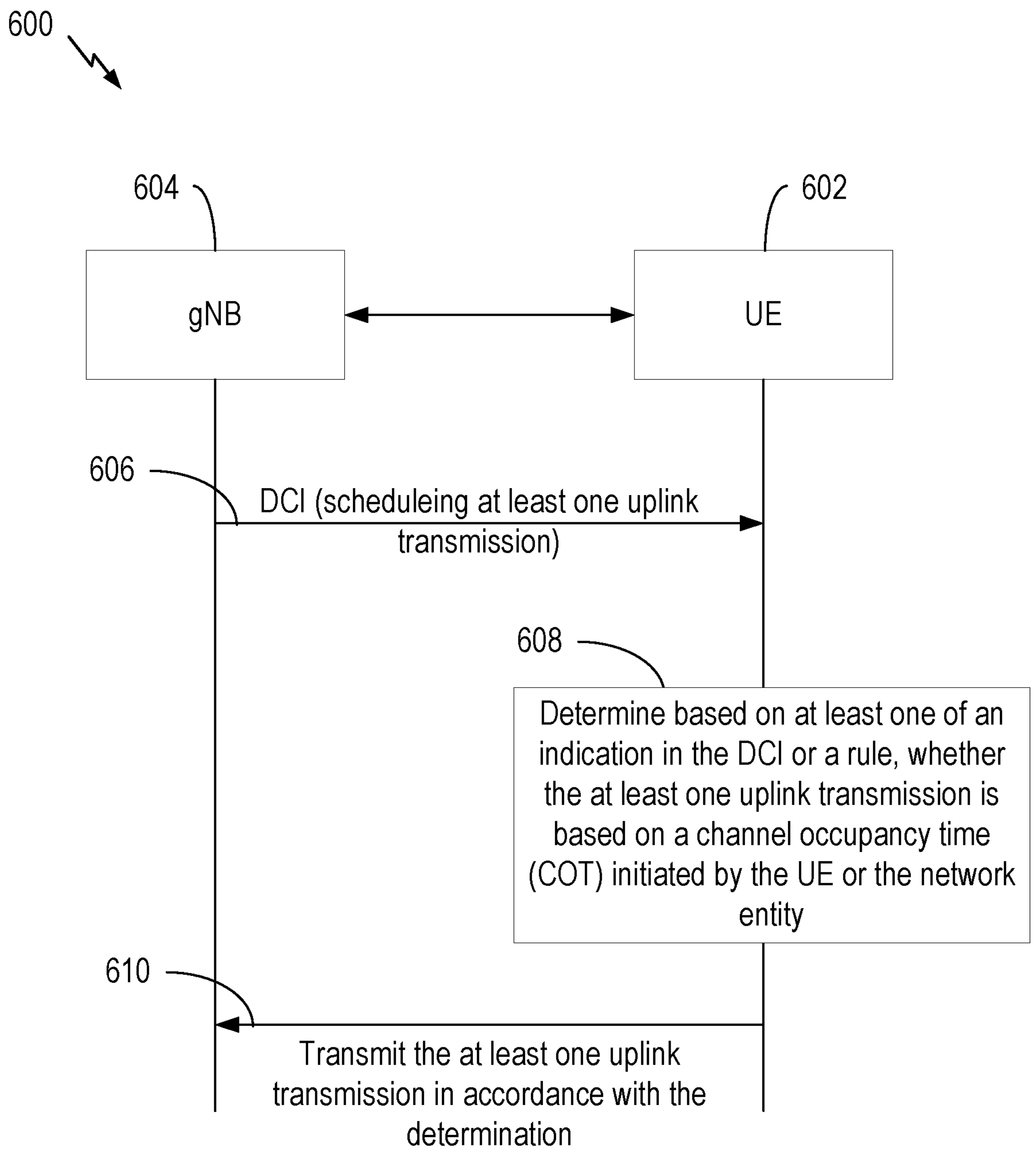
FIG. 6 depicts an example call flow diagram illustrating example communication between a UE and a network entity.

Operations 400 and 500 of FIGS. 4 and 5 may be understood with reference to the call flow diagram 600 of FIG. 6. For example, a UE 602 of FIG. 6 may perform operations 400 of FIG. 4, while a network entity (e.g., gNB) 604 of FIG. 6 may perform operations 500 of FIG. 5.

As shown, at 606, the network entity 604 transmits a DCI to the UE 602. The DCI schedules at least one uplink transmission from the UE 602 to the network entity 604. In some cases, the DCI may include DCI format 0_0, DCI format 1_0, DCI format 0_1, DCI format 1_1, DCI format 0_2, and DCI format 1_2. Different DCI formats may have different fields, which may be used to indicate whether the UE 602 is to use a UE-initiated COT or shared gNB COT.

At 608, the UE 602 determines, based on at least one of an indication in the DCI or a rule, whether the at least one uplink transmission is based on a COT initiated by the UE or a COT initiated by the network entity.

The network entity 604 may perform a similar determination (not shown) in order to properly expect the uplink transmission from the UE based on the determined COT. For example, because the UE 602 has alternative options in terms of using a COT initiated by the UE 602 or using a COT shared from the network entity 604, the indication in the DCI or the rule known by both the UE 602 and the network entity 604 enable the determination on both. For example, the indication may be a field or a value for certain fields in the DCI, configurable by the network entity 604. When a corresponding field for indication is absent, the UE 602 may use rules configured by the network entity 604 for the determination.

At 610, the UE 602 transmits the uplink transmission in accordance with the determination.

In aspects, the indication in the DCI includes a channel access priority class (CAPC) field. An example of the CAPC field indication is shown in FIGS. 7 and 8.

Figure 7:
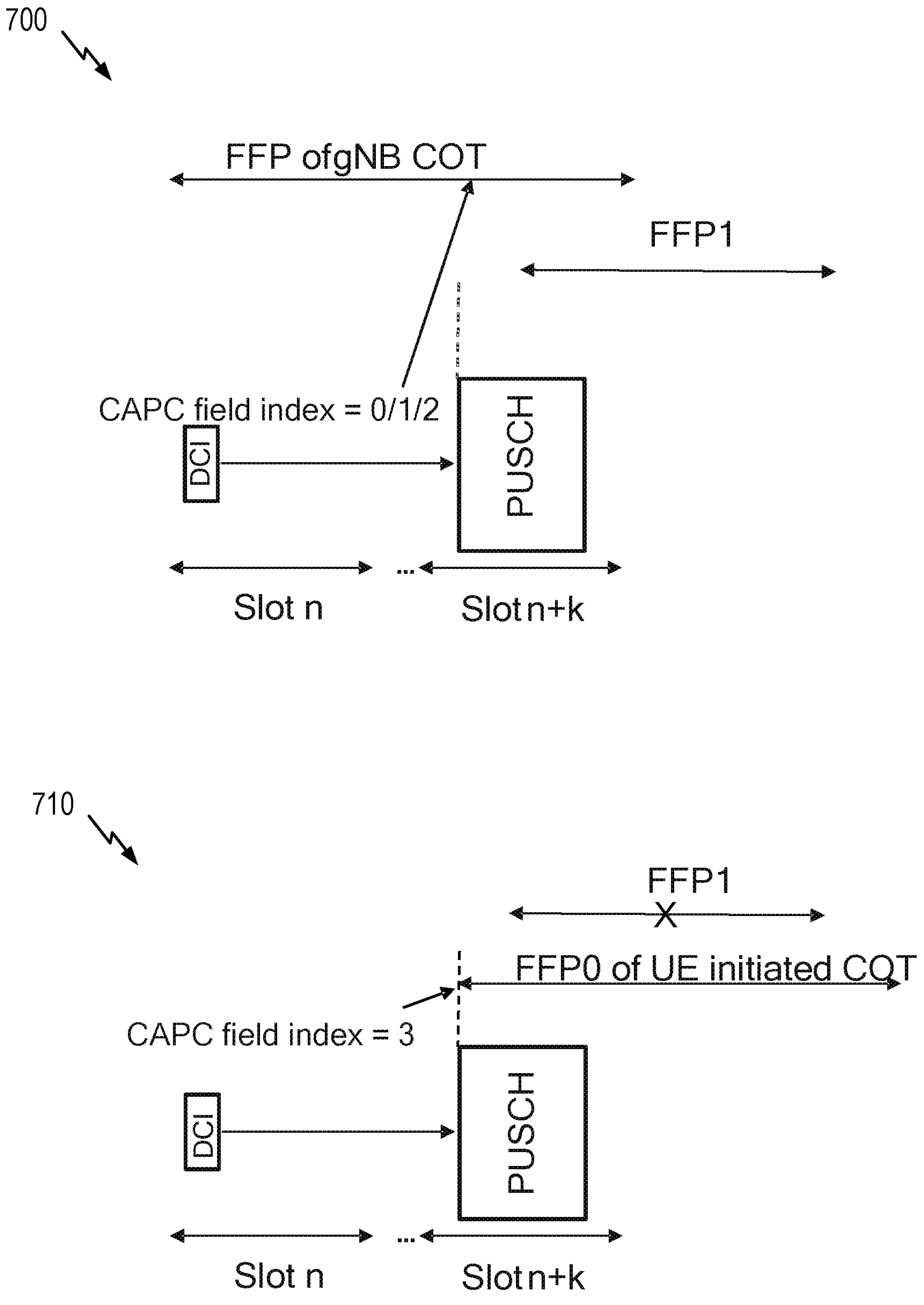
FIG. 7 depicts example diagrams for dynamically indicating a channel occupancy time (COT) for an uplink transmission using channel access priority class (CAPC) field indices.
Figure 8:
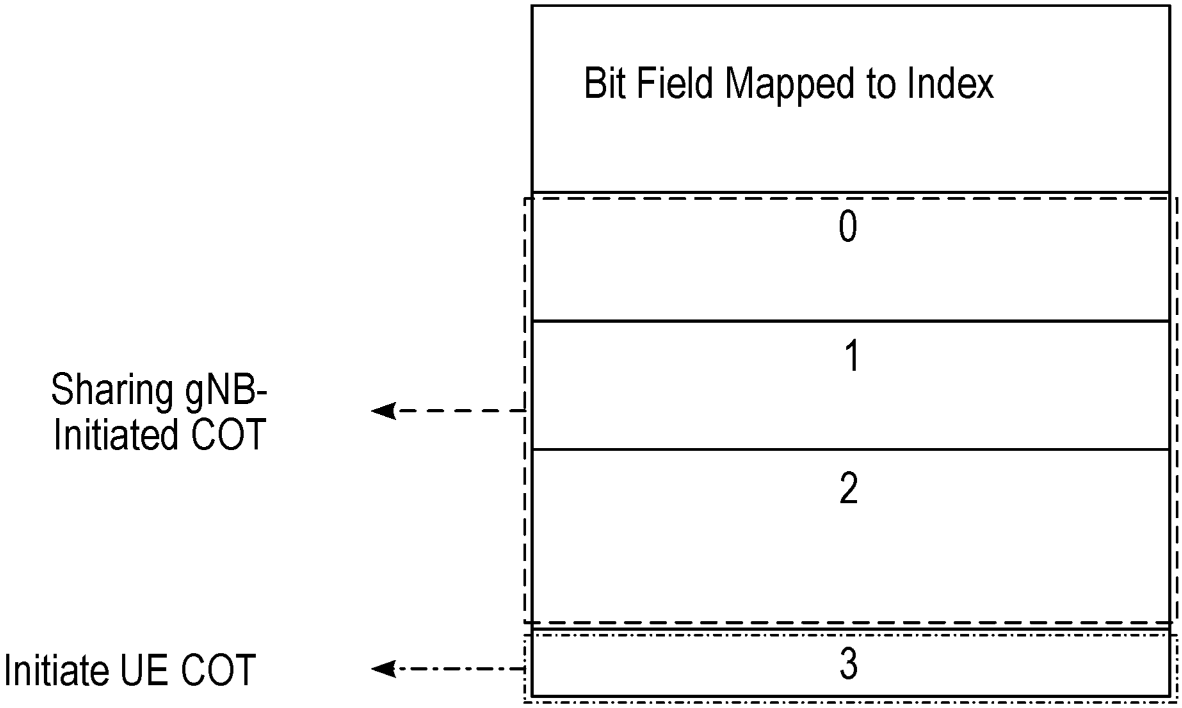
FIG. 8 depicts an example mapping of a CAPC bit field to COT indications, as shown in FIG. 7.

FIG. 7 depicts a first example 700 using a first index to indicate a COT initiated by a network entity, and a second example 710 using a second index to indicate the COT initiated by a UE. FIG. 8 depicts an example bit field that maps to the first index and the second index. For example, bit field values of 0, 1, and 2 are mapped to a first CAPC field index for indicating the COT initiated by the network entity, as shown in the first example 700.

On the other hand, the bit field value 3 is mapped to a second CAPC field index for indicating the COT initiated by the UE, as shown in the second example 720. The UE initiates its own COT when the scheduled uplink transmission is aligned with a fixed frame period (FFP) starting point as shown. In the illustrated example, the scheduled uplink transmission is aligned with a first FFP (FFP0), but not a second FFP (FFP1), therefore the uplink transmission is based on FFP0.

In some cases, DCI format 0_1 and 1_1 include the CAPC field, which may readily be able to implement such indication. For other DCI formats, such as DCI format 0_2 and 1_2, a same field as the CAPC field in DCI format 0_1 or 1_1 may be added. This way, a consistent use of the CAPC field to indicate the COT types may be achieved and good backward compatibility may result. In some cases, the indication in the DCI includes a field set to a first value to indicate the COT initiated by the UE and set to a second value to indicate the COT initiated by the network entity when the DCI does not include a CAPC field.

In some cases, the indication in the DCI may include a priority indicator (such as an existing priority indicator field) using a first value to indicate the COT initiated by the UE and a second value to indicate the COT initiated by the network entity. For example, the priority indicator field is configurable, such as to be 0 bits (the field is absent) or 1 bit.

Figure 9:
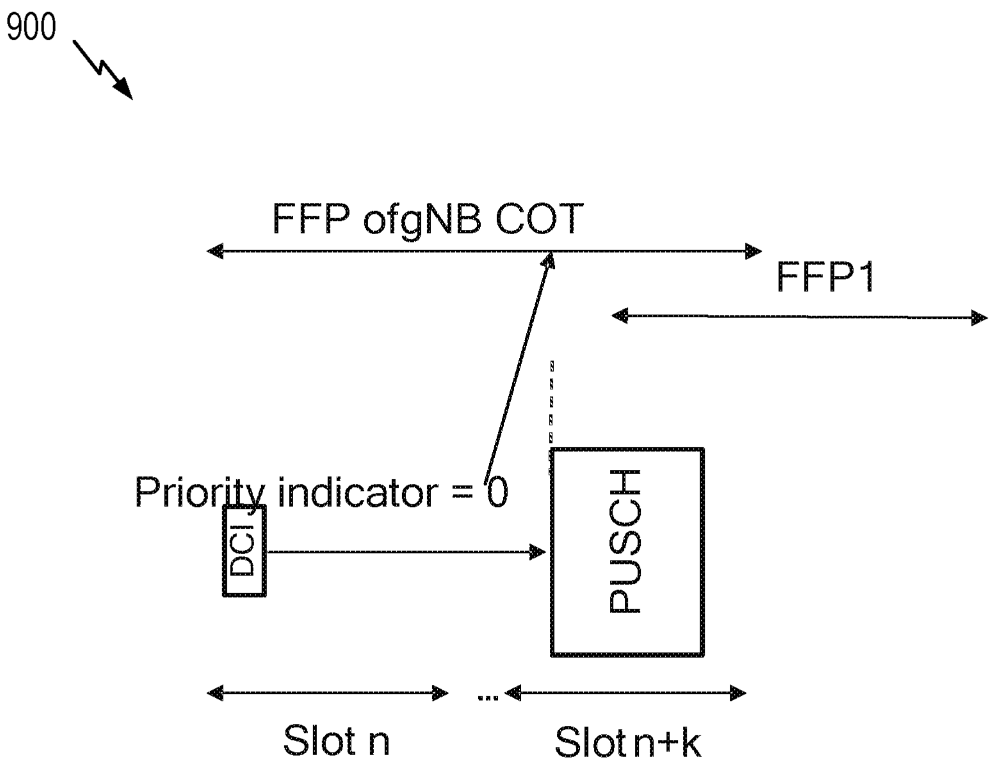
FIG. 9 depicts example diagrams for dynamically indicating a COT for an uplink transmission using priority indicators.
Figure 9:
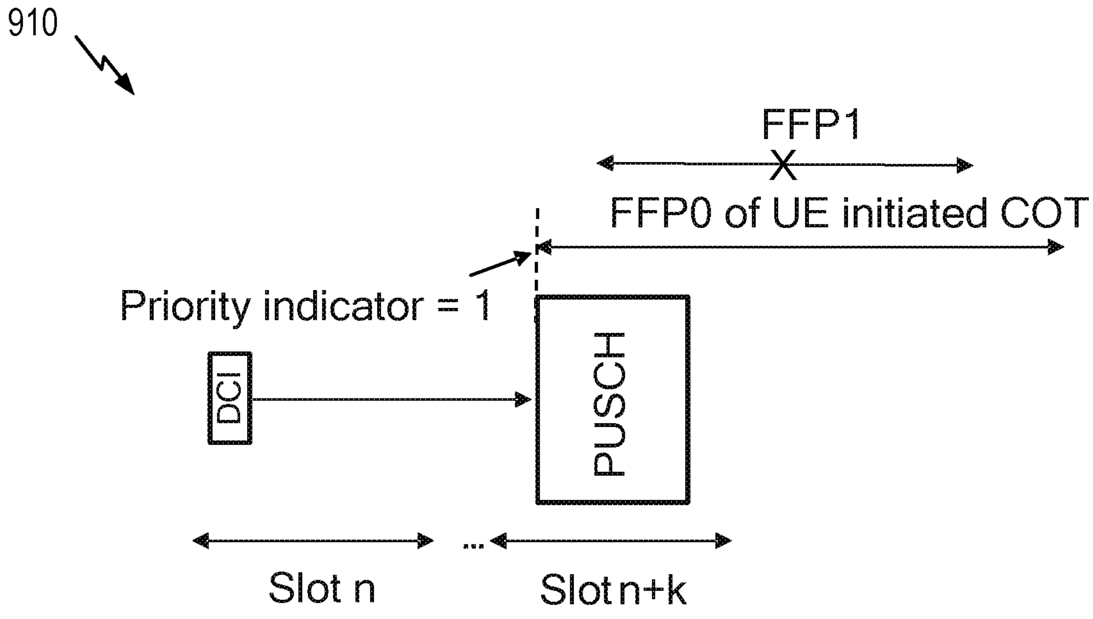

An example of the priority indicator field is shown in FIG. 9. FIG. 9 depicts a first example 900 using a value of "0" for the priority indicator field to indicate the COT initiated by the network entity, and a second example 910 using a value of "1" for the priority indicator field to indicate the COT initiated by the UE. As shown, when the value in the priority indictor field is indicated as 1, the UE will initiate its own COT when the scheduled uplink transmission is aligned with the UE FFP starting point. As such, in some cases, only high priority uplink transmission (i.e., when the priority indicator is "1") may initiate UE COT. Otherwise, when the scheduled uplink transmission is not aligned with the UE FFP starting point, such as shown in "FFP1," then the uplink transmission is based on the COT initiated by the network entity (as shown in example 900).

In aspects, the indication in the DCI includes a COT initiator indicator field using a first value to indicate the COT initiated by the UE and a second value to indicate the COT initiated by the network entity. For example, the COT initiator indicator field may be a new field added to the DCI. The COT initiator indicator field may be configured to be present in the DCI or otherwise, such as by radio resource control (RRC) for example.

Figure 10:
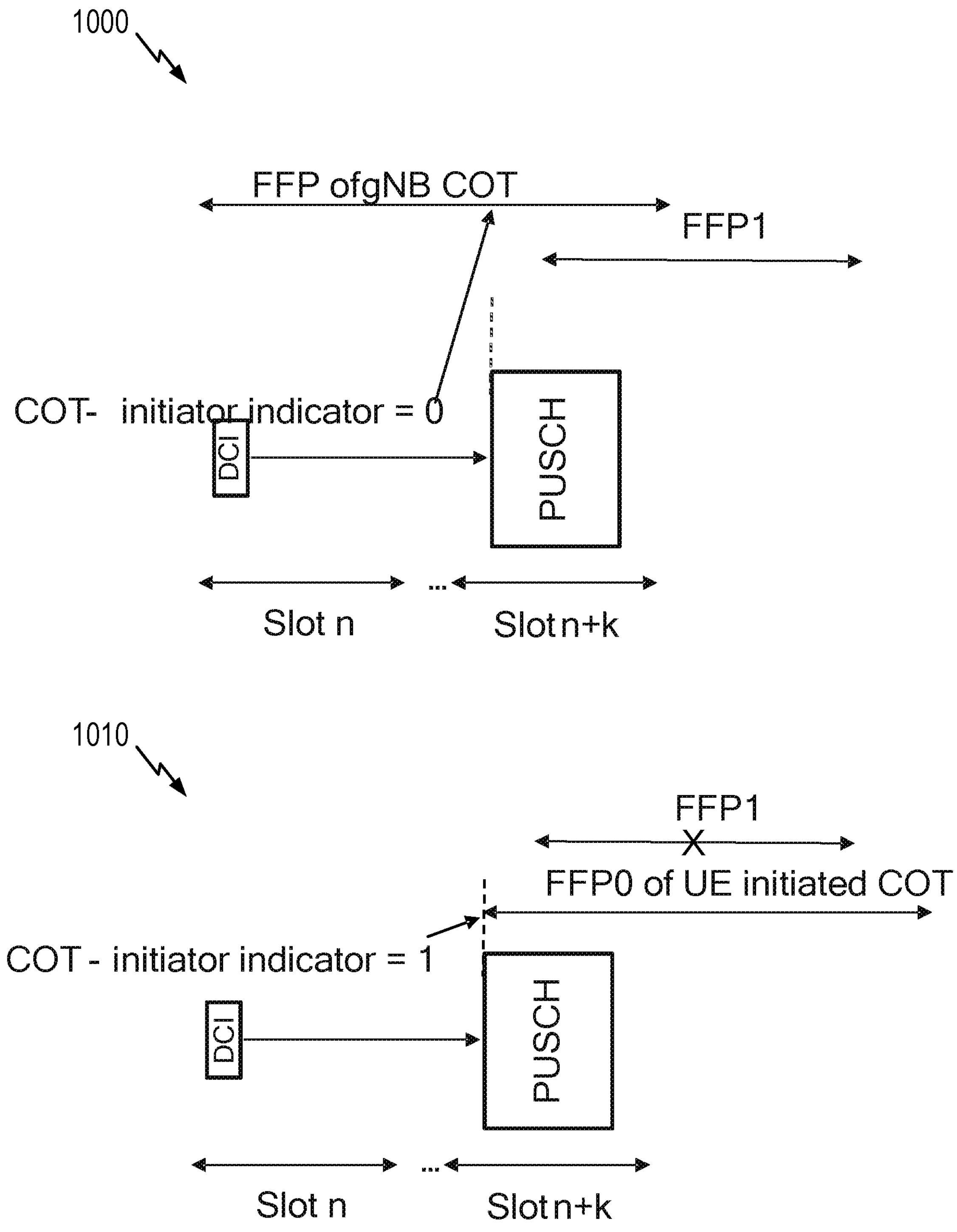
FIG. 10 depicts example diagrams for dynamically indicating a COT for an uplink transmission using COT initiator indicators.

An example of the COT initiator indicator field is shown in FIG. 10. FIG. 10 depicts a first example 1000 using "0" for the COT initiator indicator field to indicate the COT initiated by the network entity, and a second example 1010 using "1" for the COT initiator indicator field to indicate the COT initiated by the UE. As shown, when the value in the COT initiator indictor field is indicated as 1, the UE will initiate its own COT when the scheduled uplink transmission is aligned with the UE FFP starting point. Otherwise, when the scheduled uplink transmission is not aligned with the UE FFP starting point, such as shown in "FFP1," then the uplink transmission is based on the COT initiated by the network entity (as shown in example 1000). In some cases, for any uplink transmission that is aligned with the UE FFP starting point, the UE may initiate its own COT for such uplink transmission.

In aspects, the indication in the DCI includes a CAPC field (or an equivalent field as the CAPC field) for listen-before-talk (LBT) type indication. For example, the CAPC field for LBT type indication may use a first channel access type (CAT1) to indicate the COT initiated by the UE and a second channel access type (CAT2) to indicate the COT initiated by the network entity. That is, the UE may determine whether to initiate a UE COT or to share a COT initiated by the network entity based on the LBT type indicated by the CAPC field. An example of the CAPC field indicating LBT type is shown in FIGS. 11 and 12.

Figure 11:
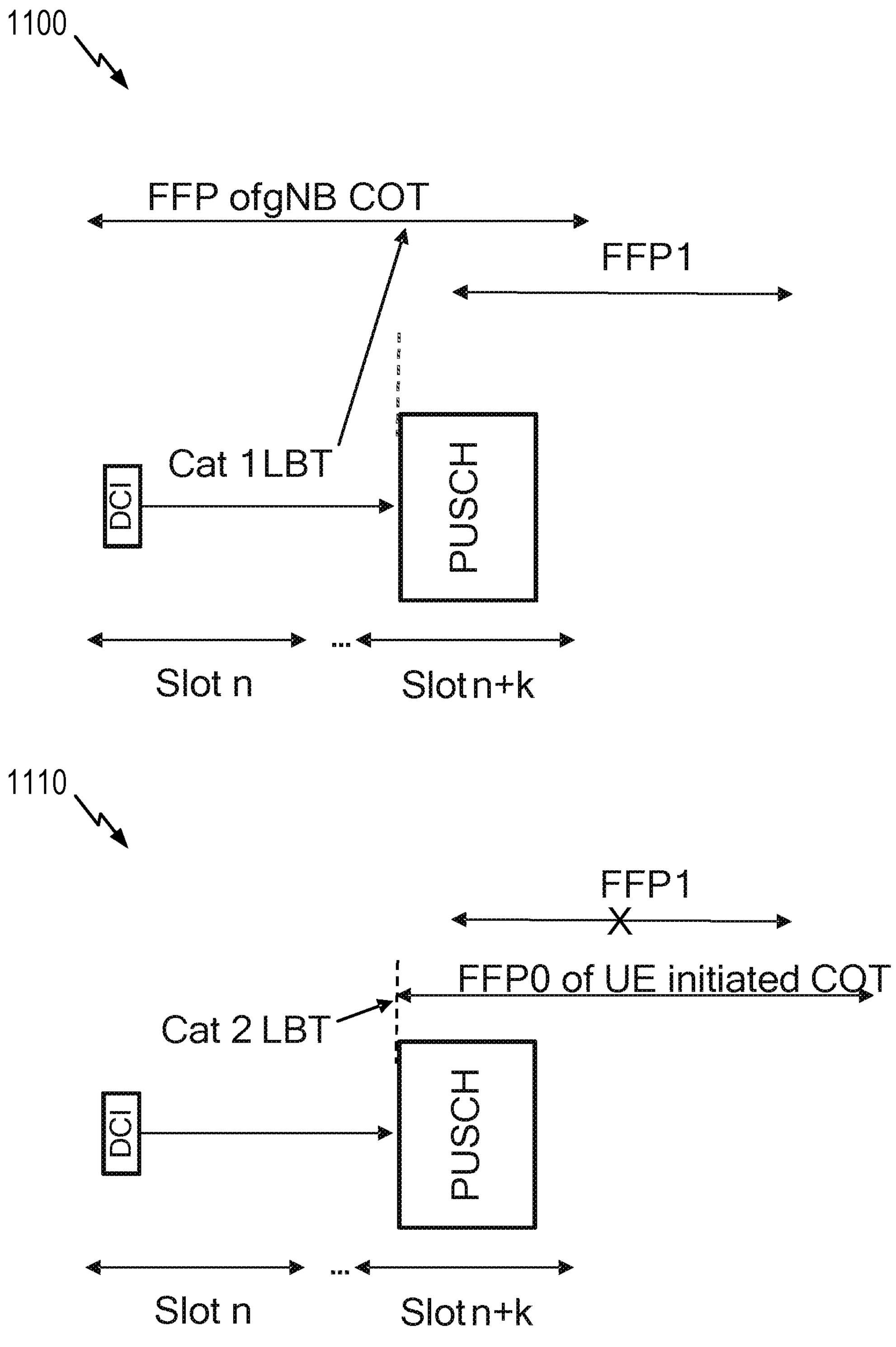
FIG. 11 depicts example diagrams for dynamically indicating a COT for an uplink transmission using channel access types (CATs).
Figure 12:
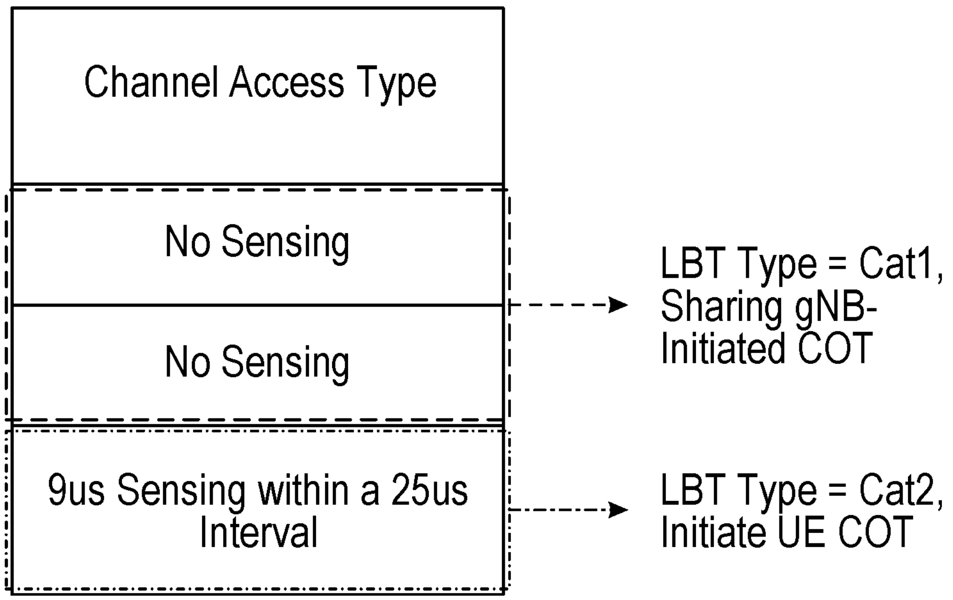
FIG. 12 depicts an example mapping of listen before talk (LBT) types to COT indications, as shown in FIG. 11.

FIG. 11 depicts a first example 1100 using CAT1 LBT to indicate the COT initiated by the network entity, and a second example 1110 using CAT2 LBT to indicate the COT initiated by the UE. FIG. 12 depicts an example channel access type that maps to CAT1 and CAT2. For example, when the LBT type is no sensing or CAT1, COT initiated by the network entity will be used. When the LBT type is sensing within a 25 us interval or CAT2, COT initiated by the UE will be used.

CAT1 LBT for indicating the COT initiated by the network entity is shown in the first example 1100 of FIG. 11. The UE determines the uplink transmission to be based on the COT initiated by the network entity. CAT2 LBT for indicating the COT initiated by the UE is shown in the second example 1120. The UE initiates its own COT when the scheduled uplink transmission is aligned with the fixed frame period (FFP) starting point as shown. As such, a unified design for DCI formats X_1 and DCI format X_2 (X=0, 1, 2, etc.) is achieved.

In certain aspects, when the DCI does not include a corresponding indicator or when the value or field of a COT initiator indicator is absent, the UE and network entity may determine the COT types based on one or more rules.

In some cases, the rule may include a pre-coded set of instructions for the UE to initiate the COT applicable to uplink transmissions including at least one of: scheduling request, physical uplink control channel (PUCCH), sounding reference signal (SRS), or physical uplink shared channel (PUSCH), such as with a high priority.

In some cases, the rule may include a configuration by RRC for the UE to initiate the COT applicable to uplink transmissions. The configuration includes at least one of: scheduling request, PUCCH. SRS, or PUSCH, such as with high priority.

In some cases, the rule may be provided by a media access control (MAC) control element (CE) for indicating the UE to initiate the COT applicable to uplink transmissions including at least one of: scheduling request. PUCCH, SRS, or PUSCH, such as with high priority.

In certain aspects, the UE may determine, regardless whether the network entity has initiated a COT in a next FFP, whether the at least one uplink transmission is based on a COT initiated by the UE or a COT initiated by the network entity based on the at least one of the indication in the DCI or the rule. The UE then transmits the at least one uplink transmission, in accordance with the determination.

In aspects, the UE may, upon determining that the network entity has not initiated a network entity FFP in a next network FFP, initiate the COT regardless of the rule or the DCI received from the network entity. The UE then transmits the at least one uplink transmission to the network entity based on the COT initiated by the UE.

Example Wireless Communication Devices

Figure 13:
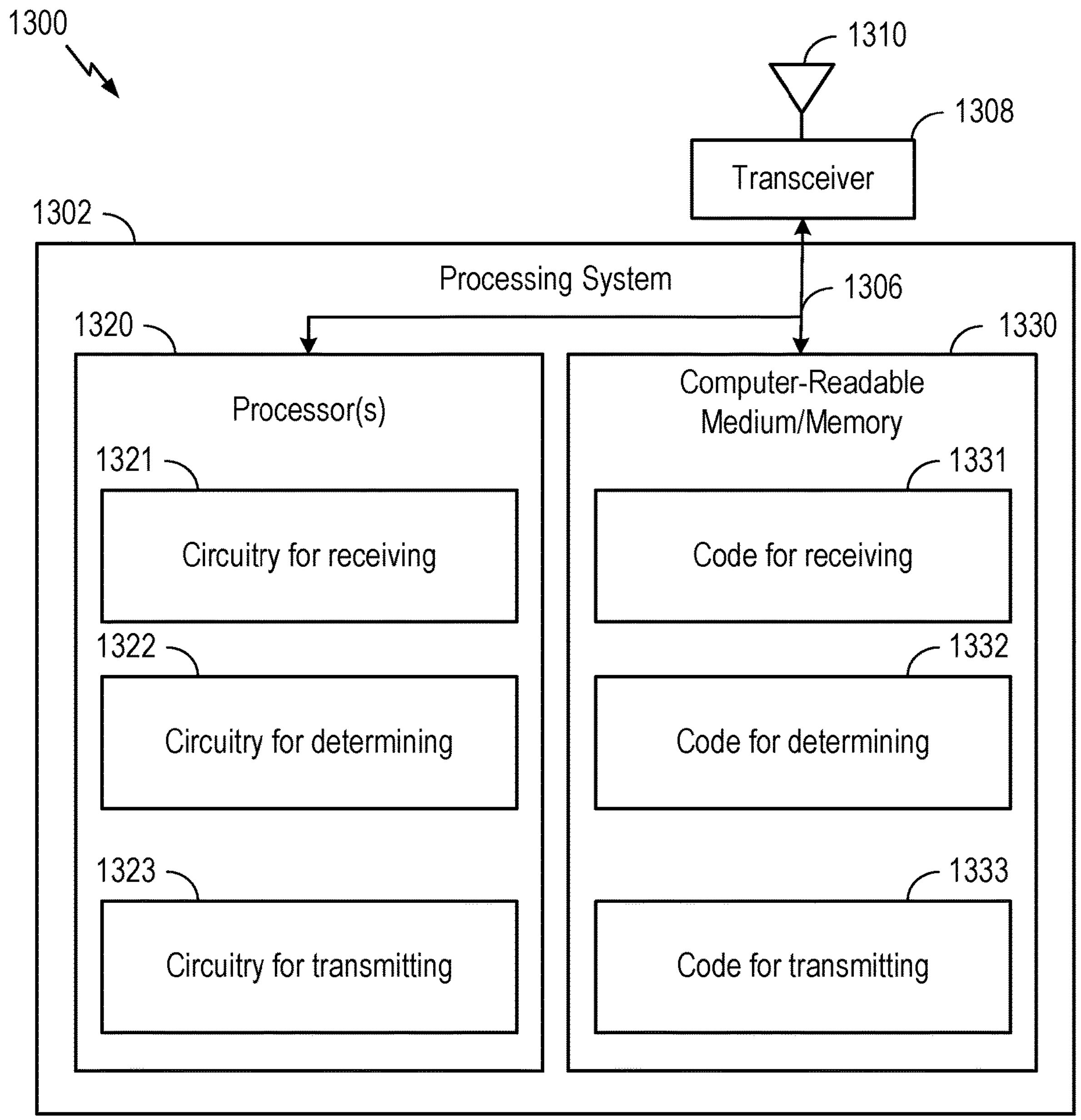
FIG. 13 depicts aspects of an example communications device.

FIG. 13 depicts an example communications device 1300 that includes various components operable, configured, or adapted to perform operations for the techniques disclosed herein, such as the operations depicted and described with respect to FIG. 4. In some examples, communication device 1300 may be a UE, such as the UE 104 as described, for example with respect to FIGS. 1 and 2.

Communications device 1300 includes a processing system 1302 coupled to a transceiver 1308 (e.g., a transmitter and/or a receiver). Transceiver 1308 is configured to transmit (or send) and receive signals for the communications device 1300 via an antenna 1310, such as the various signals as described herein. Processing system 1302 may be configured to perform processing functions for communications device 1300, including processing signals received and/or to be transmitted by communications device 1300.

Processing system 1302 includes one or more processors 1320 coupled to a computer-readable medium/memory 1330 via a bus 1306. In certain aspects, computer-readable medium/memory 1330 is configured to store instructions (e.g., computer-executable code) that when executed by the one or more processors 1320, cause the one or more processors 1320 to perform the operations illustrated in FIG. 4, or other operations for performing the various techniques discussed herein for indicating and determining COT types.

In the depicted example, computer-readable medium/memory 1330 stores code 1331 for receiving from a network entity a DCI that schedules at least one uplink transmission from the UE, code 1332 for determining based on an indication in the DCI whether the at least one uplink transmission is based on a COT initiated by the UE or a COT initiated by the network entity, and code 1333 for transmitting the at least one uplink transmission in accordance with the determination.

In the depicted example, the one or more processors 1320 include circuitry configured to implement the code stored in the computer-readable medium/memory 1330, including circuitry 1321 for receiving from a network entity a DCI that schedules at least one uplink transmission from the UE, circuitry 1322 for determining based on an indication in the DCI whether the at least one uplink transmission is based on a COT initiated by the UE or a COT initiated by the network entity, and circuitry 1323 for transmitting the at least one uplink transmission in accordance with the determination.

Various components of communications device 1300 may provide means for performing the methods described herein, including with respect to FIG. 4.

In some examples, means for transmitting or sending (or means for outputting for transmission) may include the transceivers 254 and/or antenna(s) 252 of the UE 104 illustrated in FIG. 2 and/or transceiver 1308 and antenna 1310 of the communication device 1300 in FIG. 13.

In some examples, means for receiving (or means for obtaining) may include the transceivers 254 and/or antenna(s) 252 of the UE 104 illustrated in FIG. 2 and/or transceiver 1308 and antenna 1310 of the communication device 1300 in FIG. 13.

In some examples, means for receiving from a network entity a DCI that schedules at least one uplink transmission from the UE, means for determining based on an indication in the DCI whether the at least one uplink transmission is based on a COT initiated by the UE or a COT initiated by the network entity, and means for transmitting the at least one uplink transmission in accordance with the determination, may include various processing system components, such as: the one or more processors 1320 in FIG. 13, or aspects of the UE 104 depicted in FIG. 2, including receive processor 258, transmit processor 264, TX MIMO processor 266, and/or controller/processor 280 (including the COT manager 281).

Notably, FIG. 13 is an example, and many other examples and configurations of communication device 1300 are possible.

Figure 14:
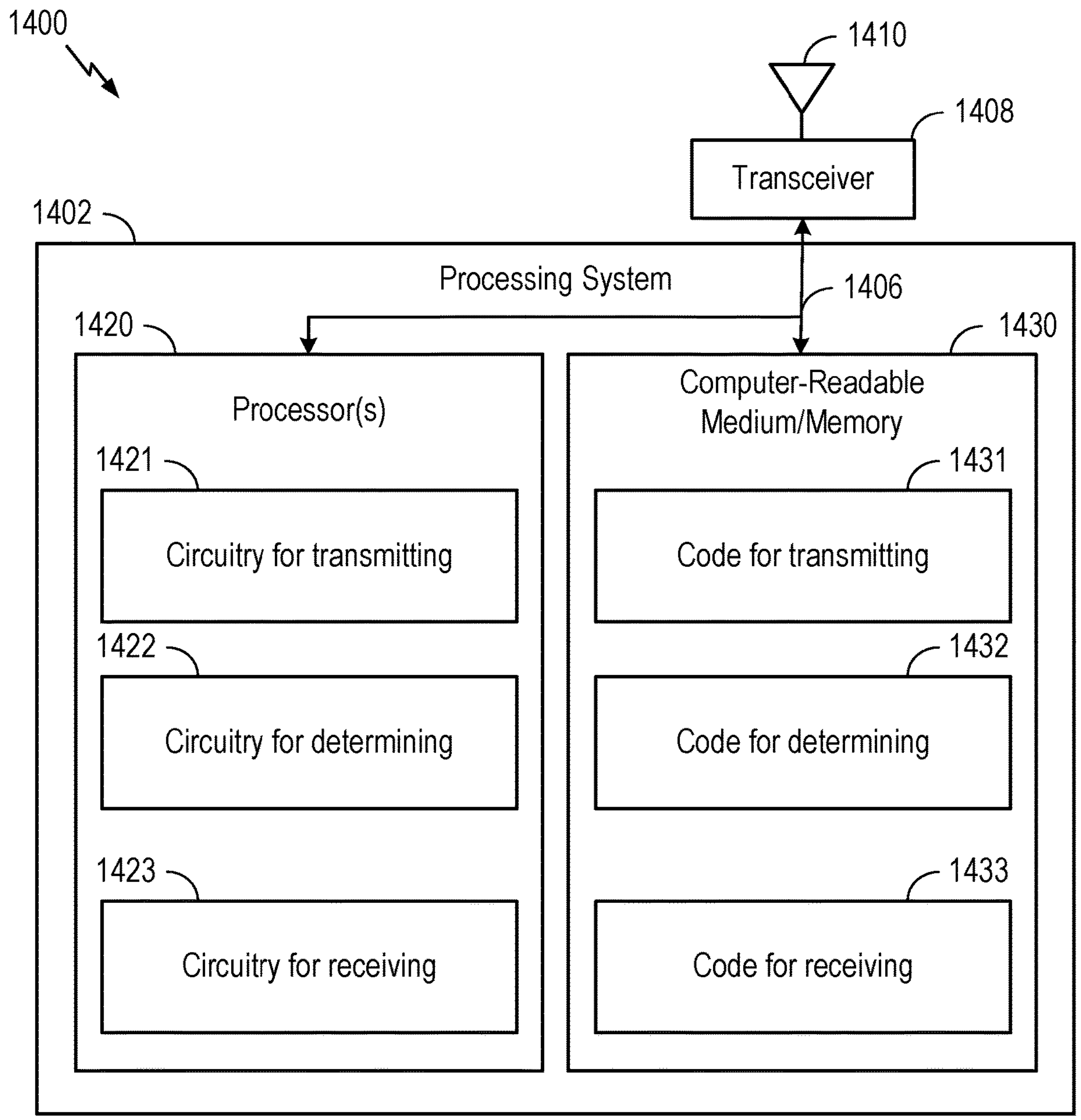
FIG. 14 depicts aspects of an example communications device.

FIG. 14 depicts an example communications device 1400 that includes various components operable, configured, or adapted to perform operations for the techniques disclosed herein, such as the operations depicted and described with respect to FIG. 5. In some examples, communication device 1400 may be a second network entity, such as another base station 102 as described, for example with respect to FIGS. 1, and 2.

Communications device 1400 includes a processing system 1402 coupled to a transceiver 1408 (e.g., a transmitter and/or a receiver). Transceiver 1408 is configured to transmit (or send) and receive signals for the communications device 1400 via an antenna 1410, such as the various signals as described herein. Processing system 1402 may be configured to perform processing functions for communications device 1400, including processing signals received and/or to be transmitted by communications device 1400.

Processing system 1402 includes one or more processors 1420 coupled to a computer-readable medium/memory 1430 via a bus 1406. In certain aspects, computer-readable medium/memory 1430 is configured to store instructions (e.g., computer-executable code) that when executed by the one or more processors 1420, cause the one or more processors 1420 to perform the operations illustrated in FIG. 5, or other operations for performing the various techniques discussed herein for indicating and determining COT types.

In the depicted example, computer-readable medium/memory 1430 stores code 1431 for transmitting to a UE a DCI that schedules at least one uplink transmission from the UE, code 1432 for determining based on an indication in the DCI whether the at least one uplink transmission is based on a COT initiated by the UE or a COT initiated by the network entity, and code 1433 for receiving the at least one uplink transmission from the UE in accordance with the determination.

In the depicted example, the one or more processors 1420 include circuitry configured to implement the code stored in the computer-readable medium/memory 1430, including circuitry 1421 for transmitting to a UE a DCI that schedules at least one uplink transmission from the UE, circuitry 1422 for determining based on an indication in the DCI whether the at least one uplink transmission is based on a COT initiated by the UE or a COT initiated by the network entity, and circuitry 1422 for receiving the at least one uplink transmission from the UE in accordance with the determination.

Various components of communications device 1400 may provide means for performing the methods described herein, including with respect to FIG. 5.

In some examples, means for transmitting or sending (or means for outputting for transmission) may include the transceivers 232 and/or antenna(s) 234 of the base station 102 illustrated in FIG. 2 and/or transceiver 1408 and antenna 1410 of the communication device 1400 in FIG. 14.

In some examples, means for receiving (or means for obtaining) may include the transceivers 232 and/or antenna(s) 234 of the base station 102 illustrated in FIG. 2 and/or transceiver 1408 and antenna 1410 of the communication device 1400 in FIG. 14.

In some cases, rather than actually transmitting, for example, signals and/or data, a device may have an interface to output signals and/or data for transmission (a means for outputting). For example, a processor may output signals and/or data, via a bus interface, to a radio frequency (RF) front end for transmission. Similarly, rather than actually receiving signals and/or data, a device may have an interface to obtain the signals and/or data received from another device (a means for obtaining). For example, a processor may obtain (or receive) the signals and/or data, via a bus interface, from an RF front end for reception. In various aspects, an RF front end may include various components, including transmit and receive processors, transmit and receive multiple input multiple output (MIMO) processors, modulators, demodulators, and the like, such as depicted in the examples in FIG. 2.

In some examples, means for transmitting to a UE a DCI that schedules at least one uplink transmission from the UE, means for determining based on an indication in the DCI whether the at least one uplink transmission is based on a COT initiated by the UE or a COT initiated by the network entity, and means for receiving the at least one uplink transmission from the UE in accordance with the determination, may include various processing system components, such as: the one or more processors 1420 in FIG. 14, or aspects of the base station 102 depicted in FIG. 2, including receive processor 238, transmit processor 220, TX MIMO processor 230, and/or controller/processor 240 (including the COT manager 241).

Notably, FIG. 14 is an example, and many other examples and configurations of communication device 1400 are possible.

Example Clauses

Implementation examples are described in the following numbered clauses:

Clause 1: A method for wireless communications by a user equipment (UE), comprising: receiving from a network entity, a downlink control information (DCI) that schedules at least one uplink transmission from the UE; determining, based on an indication in the DCI, whether the at least one uplink transmission is based on a channel occupancy time (COT) initiated by the UE or a COT initiated by the network entity; and transmitting the at least one uplink transmission in accordance with the determination.

Clause 2: The method of Clause 1, wherein the DCI comprises DCI format 0_2, and DCI format 1_2.

Clause 3: The method of Clause 1, wherein the indication in the DCI comprises a channel access priority class (CAPC) field, wherein the CAPC field uses a first index to indicate the COT initiated by the UE and a second index to indicate the COT initiated by the network entity.

Clause 4: The method of Clause 1, wherein the indication in the DCI comprises a field using a first index to indicate the COT initiated by the UE and a second index to indicate the COT initiated by the network entity when the DCI does not include a channel access priority class (CAPC) field.

Clause 5: The method of Clause 2, wherein the indication in the DCI comprises a channel access priority class (CAPC) field for listen-before-talk (LBT) type indication, wherein the CAPC field for LBT type indication uses a first channel access type (CAT1) to indicate the COT initiated by the UE and a second channel access type (CAT2) to indicate the COT initiated by the network entity.

Clause 6: The method of Clause 1, wherein the indication in the DCI comprises a priority indicator using a first value to indicate the COT initiated by the UE and a second value to indicate the COT initiated by the network entity.

Clause 7: The method of Clause 1, wherein the indication in the DCI comprises a COT initiator indicator field using a first value to indicate the COT initiated by the UE and a second value to indicate the COT initiated by the network entity.

Clause 8: The method of Clause 7, wherein a presence of the COT initiator indicator filed is configurable by radio resource control (RRC).

Clause 9: The method of Clause 7, further comprising, upon determining the first value in the COT initiator indicator field, aligning the at least one uplink transmission with a starting point of a fixed frame period (FFP) for transmitting the at least one uplink transmission based on the COT initiated by the UE and upon determining the second value in the COT initiator indicator field, transmitting the at least one uplink transmission based on the COT initiated by the network entity.

Clause 10: The method of Clause 1, wherein the determining further comprises determining, based on a rule, whether the at least one uplink transmission is based on the COT initiated by the UE or the COT initiated by the network entity.

Clause 11: The method of Clause 10, wherein the rule comprises a pre-coded set of instructions for the UE to initiate the COT applicable to uplink transmissions including at least one of: scheduling request, physical uplink control channel (PUCCH), sounding reference signal (SRS), or physical uplink shared channel (PUSCH).

Clause 12: The method of Clause 10, wherein the rule comprises a configuration by a radio resource control (RRC) for the UE to initiate the COT applicable to uplink transmissions including at least one of: scheduling request, physical uplink control channel (PUCCH), sounding reference signal (SRS), or physical uplink shared channel (PUSCH).

Clause 13: The method of Clause 10, wherein the rule is provided by a media access control (MAC) control element (CE) for indicating the UE to initiate the COT applicable to uplink transmissions including at least one of: scheduling request, physical uplink control channel (PUCCH), sounding reference signal (SRS), or physical uplink shared channel (PUSCH).

Clause 14: The method of Clause 10, further comprising: determining, regardless whether the network entity has initiated a COT in a next fixed frame period (FFP), whether the at least one uplink transmission is based on a COT initiated by the UE or a COT initiated by the network entity based on the at least one of the indication in the DCI or the rule; and transmitting the at least one uplink transmission in accordance with the determination.

Clause 15: The method of Clause 10, further comprising: upon determining that the network entity has not initiated a network entity fixed frame period (FFP) in a next network FFP, initiating the COT regardless of the rule or the DCI received from the network entity; and transmitting the at least one uplink transmission to the network entity based on the COT initiated by the UE.

Clause 16: A method for wireless communications by a network entity, comprising: transmitting to a user equipment (UE), a downlink control information (DCI) that schedules at least one uplink transmission from the UE; determining, based on an indication in the DCI, whether the at least one uplink transmission is based on a channel occupancy time (COT) initiated by the UE or a COT initiated by the network entity; and receiving the at least one uplink transmission from the UE in accordance with the determination.

Clause 17: The method of Clause 16, wherein the DCI comprises DCI format 0_0, DCI format 1_0, DCI format 0_1, DCI format 1_1, DCI format 0_2, and DCI format 1_2.

Clause 18: The method of Clause 17, wherein the indication in the DCI comprises a channel access priority class (CAPC) field, wherein the CAPC field uses a first index to indicate the COT initiated by the UE and a second index to indicate the COT initiated by the network entity.

Clause 19: The method of Clause 17, wherein the indication in the DCI comprises a field using a first index to indicate the COT initiated by the UE and a second index to indicate the COT initiated by the network entity when the DCI does not include a channel access priority class (CAPC) field.

Clause 20: The method of Clause 17, wherein the indication in the DCI comprises a channel access priority class (CAPC) field for listen-before-talk (LBT) type indication, wherein the CAPC field for LBT type indication uses a first channel access type (CAT1) to indicate the COT initiated by the UE and a second channel access type (CAT2) to indicate the COT initiated by the network entity.

Clause 21: The method of Clause 16, wherein the indication in the DCI comprises a priority indicator using a first value to indicate the COT initiated by the UE and a second value to indicate the COT initiated by the network entity.

Clause 22: The method of Clause 16, wherein the indication in the DCI comprises a COT initiator indicator field using a first value to indicate the COT initiated by the UE and a second value to indicate the COT initiated by the network entity.

Clause 23: The method of Clause 22, wherein the COT initiator indicator filed is configurable to be included in the DCI or otherwise.

Clause 24: The method of Clause 22, further comprising, upon determining the first value in the COT initiator indicator field, aligning the at least one uplink transmission with a starting point of a fixed frame period (FFP) for transmitting the at least one uplink transmission based on the COT initiated by the UE and upon determining the second value in the COT initiator indicator field, transmitting the at least one uplink transmission based on the COT initiated by the network entity.

Clause 25: The method of Clause 16, wherein the determining further comprises determining, based on a rule, whether the at least one uplink transmission is based on the COT initiated by the UE or the COT initiated by the network entity.

Clause 26: The method of Clause 25, wherein the rule comprises a pre-coded set of instructions for the UE to initiate the COT applicable to uplink transmissions including at least one of: scheduling request, physical uplink control channel (PUCCH), sounding reference signal (SRS), or physical uplink shared channel (PUSCH).

Clause 27: The method of Clause 25, wherein the rule comprises a configuration by a radio resource control (RRC) for the UE to initiate the COT applicable to uplink transmissions including at least one of: scheduling request, physical uplink control channel (PUCCH), sounding reference signal (SRS), or physical uplink shared channel (PUSCH).

Clause 28: The method of Clause 25, wherein the rule is provided by a media access control (MAC) control element (CE) for indicating the UE to initiate the COT applicable to uplink transmissions including at least one of: scheduling request, physical uplink control channel (PUCCH), sounding reference signal (SRS), or physical uplink shared channel (PUSCH).

Clause 29: An apparatus, comprising: a memory comprising executable instructions; one or more processors configured to execute the executable instructions and cause the apparatus to perform a method in accordance with any one of Clauses 1-28.

Clause 30: An apparatus, comprising means for performing a method in accordance with any one of Clauses 1-28.

Clause 31: A non-transitory computer-readable medium comprising executable instructions that, when executed by one or more processors of an apparatus, cause the apparatus to perform a method in accordance with any one of Clauses 1-28.

Clause 32: A computer program product embodied on a computer-readable storage medium comprising code for performing a method in accordance with any one of Clauses 1-28.

Additional Wireless Communication Network Considerations

The techniques and methods described herein may be used for various wireless communications networks (or wireless wide area network (WWAN)) and radio access technologies (RATs). While aspects may be described herein using terminology commonly associated with 3G, 4G, and/or 5G (e.g., 5G new radio (NR)) wireless technologies, aspects of the present disclosure may likewise be applicable to other communication systems and standards not explicitly mentioned herein.

5G wireless communication networks may support various advanced wireless communication services, such as enhanced mobile broadband (eMBB), millimeter wave (mmWave), machine type communications (MTC), and/or mission critical targeting ultra-reliable, low-latency communications (URLLC). These services, and others, may include latency and reliability requirements.

Returning to FIG. 1, various aspects of the present disclosure may be performed within the example wireless communications network 100.

In 3GPP, the term "cell" can refer to a coverage area of a NodeB and/or a narrowband subsystem serving this coverage area, depending on the context in which the term is used. In NR systems, the term "cell" and BS, next generation NodeB (gNB or gNodeB), access point (AP), distributed unit (DU), carrier, or transmission reception point may be used interchangeably. A BS may provide communication coverage for a macro cell, a pico cell, a femto cell, and/or other types of cells.

A macro cell may generally cover a relatively large geographic area (e.g., several kilometers in radius) and may allow unrestricted access by UEs with service subscription. A pico cell may cover a relatively small geographic area (e.g., a sports stadium) and may allow unrestricted access by UEs with service subscription. A femto cell may cover a relatively small geographic area (e.g., a home) and may allow restricted access by UEs having an association with the femto cell (e.g., UEs in a Closed Subscriber Group (CSG) and UEs for users in the home). A BS for a macro cell may be referred to as a macro BS. A BS for a pico cell may be referred to as a pico BS. A BS for a femto cell may be referred to as a femto BS, home BS, or a home NodeB.

Base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., an SI interface). Base stations 102 configured for 5G (e.g., 5G NR or Next Generation RAN (NG-RAN)) may interface with 5GC 190 through second backhaul links 184. Base stations 102 may communicate directly or indirectly (e.g., through the EPC 160 or 5GC 190) with each other over third backhaul links 134 (e.g., X2 interface). Third backhaul links 134 may generally be wired or wireless.

Small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. Small cell 102', employing NR in an unlicensed frequency spectrum, may boost coverage to and/or increase capacity of the access network.

Some base stations, such as gNB 180 may operate in a traditional sub-6 GHz spectrum, in millimeter wave (mmWave) frequencies, and/or near mmWave frequencies in communication with the UE 104. When the gNB 180 operates in mmWave or near mmWave frequencies, the gNB 180 may be referred to as an mmWave base station.

The communication links 120 between base stations 102 and, for example, UEs 104, may be through one or more carriers. For example, base stations 102 and UEs 104 may use spectrum up to Y MHz (e.g., 5, 10, 15, 20, 100, 400, and other MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Wireless communications system 100 further includes a Wi-Fi access point (AP) 150 in communication with Wi-Fi stations (STAs) 152 via communication links 154 in, for example, a 2.4 GHz and/or 5 GHz unlicensed frequency spectrum. When communicating in an unlicensed frequency spectrum, the STAs 152/AP 150 may perform a clear channel assessment (CCA) prior to communicating in order to determine whether the channel is available.

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth. ZigBee, Wi-Fi based on the IEEE 802.11 standard, 4G (e.g., LTE), or 5G (e.g., NR), to name a few options.

EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. MME 162 may be in communication with a Home Subscriber Server (HSS) 174. MME 162 is the control node that processes the signaling between the UEs 104 and the EPC 160. Generally, MME 162 provides bearer and connection management.

Generally, user Internet protocol (IP) packets are transferred through Serving Gateway 166, which itself is connected to PDN Gateway 172. PDN Gateway 172 provides UE IP address allocation as well as other functions. PDN Gateway 172 and the BM-SC 170 are connected to the IP Services 176, which may include, for example, the Internet, an intranet, an IP Multimedia Subsystem (IMS), a PS Streaming Service, and/or other IP services.

BM-SC 170 may provide functions for MBMS user service provisioning and delivery. BM-SC 170 may serve as an entry point for content provider MBMS transmission, may be used to authorize and initiate MBMS Bearer Services within a public land mobile network (PLMN), and may be used to schedule MBMS transmissions. MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

5GC 190 may include an Access and Mobility Management Function (AMF) 192, other AMFs 193, a Session Management Function (SMF) 194, and a User Plane Function (UPF) 195. AMF 192 may be in communication with a Unified Data Management (UDM) 196.

AMF 192 is generally the control node that processes the signaling between UEs 104 and 5GC 190. Generally, AMF 192 provides QoS flow and session management.

All user Internet protocol (IP) packets are transferred through UPF 195, which is connected to the IP Services 197, and which provides UE IP address allocation as well as other functions for 5GC 190. IP Services 197 may include, for example, the Internet, an intranet, an IP Multimedia Subsystem (IMS), a PS Streaming Service, and/or other IP services.

Returning to FIG. 2, various example components of BS 102 and UE 104 (e.g., the wireless communication network 100 of FIG. 1) are depicted, which may be used to implement aspects of the present disclosure.

At BS 102, a transmit processor 220 may receive data from a data source 212 and control information from a controller/processor 240. The control information may be for the physical broadcast channel (PBCH), physical control format indicator channel (PCFICH), physical hybrid ARQ indicator channel (PHICH), physical downlink control channel (PDCCH), group common PDCCH (GC PDCCH), and others. The data may be for the physical downlink shared channel (PDSCH), in some examples.

A medium access control (MAC)-control element (MAC-CE) is a MAC layer communication structure that may be used for control command exchange between wireless nodes. The MAC-CE may be carried in a shared channel such as a physical downlink shared channel (PDSCH), a physical uplink shared channel (PUSCH), or a physical sidelink shared channel (PSSCH).

Processor 220 may process (e.g., encode and symbol map) the data and control information to obtain data symbols and control symbols, respectively. Transmit processor 220 may also generate reference symbols, such as for the primary synchronization signal (PSS), secondary synchronization signal (SSS), PBCH demodulation reference signal (DMRS), and channel state information reference signal (CSI-RS).

Transmit (TX) multiple-input multiple-output (MIMO) processor 230 may perform spatial processing (e.g., precoding) on the data symbols, the control symbols, and/or the reference symbols, if applicable, and may provide output symbol streams to the modulators (MODs) in transceivers 232*a*-232*t*. Each modulator in transceivers 232*a*-232*t* may process a respective output symbol stream (e.g., for OFDM) to obtain an output sample stream. Each modulator may further process (e.g., convert to analog, amplify, filter, and upconvert) the output sample stream to obtain a downlink signal. Downlink signals from the modulators in transceivers 232*a*-232*t* may be transmitted via the antennas 234*a*-234*t*, respectively.

At UE 104, antennas 252*a*-252*r* may receive the downlink signals from the BS 102 and may provide received signals to the demodulators (DEMODs) in transceivers 254*a*-254*r*, respectively. Each demodulator in transceivers 254*a*-254*r* may condition (e.g., filter, amplify, downconvert, and digitize) a respective received signal to obtain input samples. Each demodulator may further process the input samples (e.g., for OFDM) to obtain received symbols.

MIMO detector 256 may obtain received symbols from all the demodulators in transceivers 254*a*-254*r*, perform MIMO detection on the received symbols if applicable, and provide detected symbols. Receive processor 258 may process (e.g., demodulate, deinterleave, and decode) the detected symbols, provide decoded data for the UE 104 to a data sink 260, and provide decoded control information to a controller/processor 280.

On the uplink, at UE 104, transmit processor 264 may receive and process data (e.g., for the physical uplink shared channel (PUSCH)) from a data source 262 and control information (e.g., for the physical uplink control channel (PUCCH) from the controller/processor 280. Transmit processor 264 may also generate reference symbols for a reference signal (e.g., for the sounding reference signal (SRS)). The symbols from the transmit processor 264 may be precoded by a TX MIMO processor 266 if applicable, further processed by the modulators in transceivers 254*a*-254*r* (e.g., for SC-FDM), and transmitted to BS 102.

At BS 102, the uplink signals from UE 104 may be received by antennas 234*a-t*, processed by the demodulators in transceivers 232*a*-232*t*, detected by a MIMO detector 236 if applicable, and further processed by a receive processor 238 to obtain decoded data and control information sent by UE 104. Receive processor 238 may provide the decoded data to a data sink 239 and the decoded control information to the controller/processor 240.

Memories 242 and 282 may store data and program codes for BS 102 and UE 104, respectively.

Scheduler 244 may schedule UEs for data transmission on the downlink and/or uplink.

5G may utilize orthogonal frequency division multiplexing (OFDM) with a cyclic prefix (CP) on the uplink and downlink. 5G may also support half-duplex operation using time division duplexing (TDD). OFDM and single-carrier frequency division multiplexing (SC-FDM) partition the system bandwidth into multiple orthogonal subcarriers, which are also commonly referred to as tones and bins. Each subcarrier may be modulated with data. Modulation symbols may be sent in the frequency domain with OFDM and in the time domain with SC-FDM. The spacing between adjacent subcarriers may be fixed, and the total number of subcarriers may be dependent on the system bandwidth. The minimum resource allocation, called a resource block (RB), may be 12 consecutive subcarriers in some examples. The system bandwidth may also be partitioned into subbands. For example, a subband may cover multiple RBs. NR may support a base subcarrier spacing (SCS) of 15 KHz and other SCS may be defined with respect to the base SCS (e.g., 30 kHz, 60 kHz, 120 kHz, 240 kHz, and others).

As above, FIGS. 3A-3D depict various example aspects of data structures for a wireless communication network, such as wireless communication network 100 of FIG. 1.

In various aspects, the 5G frame structure may be frequency division duplex (FDD), in which for a particular set of subcarriers (carrier system bandwidth), subframes within the set of subcarriers are dedicated for either DL or UL. 5G frame structures may also be time division duplex (TDD), in which for a particular set of subcarriers (carrier system bandwidth), subframes within the set of subcarriers are dedicated for both DL and UL. In the examples provided by FIGS. 3A and 3C, the 5G frame structure is assumed to be TDD, with subframe 4 being configured with slot format 28 (with mostly DL), where D is DL, U is UL, and X is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description below applies also to a 5G frame structure that is TDD.

Other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. In some examples, each slot may include 7 or 14 symbols, depending on the slot configuration.

For example, for slot configuration 0, each slot may include 14 symbols, and for slot configuration 1, each slot may include 7 symbols. The symbols on DL may be cyclic prefix (CP) OFDM (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission).

The number of slots within a subframe is based on the slot configuration and the numerology. For slot configuration 0, different numerologies (μ) 0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology μ, there are 14 symbols/slot and 2μ slots/subframe. The subcarrier spacing and symbol length/duration are a function of the numerology. The subcarrier spacing may be equal to $2^{\mu}\times 15$ kHz, where u is the numerology 0 to 5. As such, the numerology μ=0 has a subcarrier spacing of 15 kHz and the numerology μ=5 has a subcarrier spacing of 480 kHz. The symbol length/duration is inversely related to the subcarrier spacing. FIGS. 3A-3D provide an example of slot configuration 0 with 14 symbols per slot and numerology μ=2 with 4 slots per subframe. The slot duration is 0.25 ms, the subcarrier spacing is 60 kHz, and the symbol duration is approximately 16.67 μs.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 3A, some of the REs carry reference (pilot) signals (RS) for a UE (e.g., UE 104 of FIGS. 1 and 2). The RS may include demodulation RS (DM-RS) (indicated as Rx for one particular configuration, where 100x is the port number, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 3B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol.

A primary synchronization signal (PSS) may be within symbol 2 of particular subframes of a frame. The PSS is used by a UE (e.g., 104 of FIGS. 1 and 2) to determine subframe/symbol timing and a physical layer identity.

A secondary synchronization signal (SSS) may be within symbol 4 of particular subframes of a frame. The SSS is used by a UE to determine a physical layer cell identity group number and radio frame timing.

Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 3C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 3D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Additional Considerations

The preceding description provides examples of a dynamic indication of a COT initiated by a UE or a network entity in communication systems. The preceding description is provided to enable any person skilled in the art to practice the various aspects described herein. The examples discussed herein are not limiting of the scope, applicability, or aspects set forth in the claims. Various modifications to these aspects will be readily apparent to those skilled in the art, and the generic principles defined herein may be applied to other aspects. For example, changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

The techniques described herein may be used for various wireless communication technologies, such as 5G (e.g., 5G NR), 3GPP Long Term Evolution (LTE), LTE-Advanced (LTE-A), code division multiple access (CDMA), time division multiple access (TDMA), frequency division multiple access (FDMA), orthogonal frequency division multiple access (OFDMA), single-carrier frequency division multiple access (SC-FDMA), time division synchronous code division multiple access (TD-SCDMA), and other networks. The terms “network” and “system” are often used interchangeably. A CDMA network may implement a radio technology such as Universal Terrestrial Radio Access (UTRA), cdma2000, and others. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA). Ultra Mobile Broadband (UMB), IEEE 802.11 (Wi-Fi), IEEE 802.16 (WiMAX), IEEE 802.20, Flash-OFDMA, and others. UTRA and E-UTRA are part of Universal Mobile Telecommunication System (UMTS). LTE and LTE-A are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). NR is an emerging wireless communications technology under development.

The various illustrative logical blocks, modules and circuits described in connection with the present disclosure may be implemented or performed with a general purpose processor, a DSP, an ASIC, a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, a system on a chip (SoC), or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user equipment (see FIG. 1), a user interface (e.g., keypad, display, mouse, joystick, touchscreen, biometric sensor, proximity sensor, light emitting element, and others) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

As used herein, the word "exemplary" means "serving as an example, instance, or illustration." Any aspect described herein as "exemplary" is not necessarily to be construed as preferred or advantageous over other aspects.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims. Further, the various operations of methods described above may be performed by any suitable means capable of performing the corresponding functions. The means may include various hardware and/or software component(s)

and/or module(s), including, but not limited to a circuit, an application specific integrated circuit (ASIC), or processor. Generally, where there are operations illustrated in figures, those operations may have corresponding counterpart means-plus-function components with similar numbering.

The following claims are not intended to be limited to the aspects shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112(f) unless the element is expressly recited using the phrase "means for" or, in the case of a method claim, the element is recited using the phrase "step for." All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

The invention claimed is:

1. An apparatus for wireless communications at a user equipment (UE) comprising one or more processors and at least one memory coupled with the one or more processors, the one or more processors configured to cause the UE to:

receive from a network entity, a downlink control information (DCI) that schedules at least one uplink transmission from the UE;

determine, based on an indication in the DCI, whether the at least one uplink transmission is based on a channel occupancy time (COT) initiated by the UE or a COT initiated by the network entity; and transmit the at least one uplink transmission in accordance with the determination, wherein the indication in the DCI comprises a channel access priority class (CAPC) field for listen-before-talk (LBT) type indication, wherein the CAPC field for LBT type indication uses a first channel access type (CAT1) to indicate the COT initiated by the UE and a second channel access type (CAT2) to indicate the COT initiated by the network entity.

2. The apparatus of claim 1, wherein the DCI comprises DCI format 0_2, or DCI format 1_2.

3. The apparatus of claim 1, wherein the indication in the DCI comprises a channel access priority class (CAPC) field, wherein the CAPC field uses a first index to indicate the COT initiated by the UE and a second index to indicate the COT initiated by the network entity.

4. The apparatus of claim 3, wherein the DCI comprises DCI format 0_2, or DCI format 1_2.

5. The apparatus of claim 1, wherein the indication in the DCI comprises a field using a first index to indicate the COT initiated by the UE and a second index to indicate the COT initiated by the network entity when the DCI does not include a channel access priority class (CAPC) field.

6. The apparatus of claim 1, wherein the indication in the DCI comprises a priority indicator using a first value to indicate the COT initiated by the UE and a second value to indicate the COT initiated by the network entity.

7. The apparatus of claim 6, wherein the one or more processors are configured to cause the apparatus to:

upon determining the priority indicator comprises the first value, align the at least one uplink transmission with a starting point of a fixed frame period (FFP) for transmitting the at least one uplink transmission based on the COT initiated by the UE; and upon determining the priority indicator comprises the first-second value, transmit the at least one uplink transmission based on the COT initiated by the network entity.

8. The apparatus of claim 1, wherein the indication in the DCI comprises a COT initiator indicator field using a first value to indicate the COT initiated by the UE and a second value to indicate the COT initiated by the network entity.

9. The apparatus of claim 8, wherein a presence of the COT initiator indicator field is configurable by radio resource control (RRC).

10. The apparatus of claim 8, wherein the one or more processors are configured to cause the apparatus to:

upon determining the first value in the COT initiator indicator field, align the at least one uplink transmission with a starting point of a fixed frame period (FFP) for transmitting the at least one uplink transmission based on the COT initiated by the UE; and upon determining the second value in the COT initiator indicator field, transmit the at least one uplink transmission based on the COT initiated by the network entity.

11. The apparatus of claim 1, wherein the determine further comprises determine, based on a rule, whether the at least one uplink transmission is based on the COT initiated by the UE or the COT initiated by the network entity.

12. The apparatus of claim 11, wherein the rule comprises a pre-coded set of instructions for the UE to initiate the COT applicable to uplink transmissions including at least one of: scheduling request, physical uplink control channel (PUCCH), sounding reference signal (SRS), or physical uplink shared channel (PUSCH).

13. The apparatus of claim 11, wherein the rule comprises a configuration by a radio resource control (RRC) for the UE to initiate the COT applicable to uplink transmissions including at least one of: scheduling request, physical uplink control channel (PUCCH), sounding reference signal (SRS), or physical uplink shared channel (PUSCH).

14. The apparatus of claim 11, wherein the rule is provided by a media access control (MAC) control element (CE) for indicating the UE to initiate the COT applicable to uplink transmissions including at least one of: scheduling request, physical uplink control channel (PUCCH), sounding reference signal (SRS), or physical uplink shared channel (PUSCH).

15. The apparatus of claim 11, wherein the one or more processors are configured to cause the apparatus to:

determine, regardless whether the network entity has initiated a COT in a next fixed frame period (FFP), whether the at least one uplink transmission is based on a COT initiated by the UE or a COT initiated by the network entity based on the at least one of the indication in the DCI or the rule; and transmit the at least one uplink transmission in accordance with the determination.

16. The apparatus of claim 11, wherein the one or more processors are configured to cause the apparatus to:

upon determining that the network entity has not initiated a network entity fixed frame period (FFP) in a next network FFP, initiate the COT regardless of the rule or the DCI received from the network entity; and transmit the at least one uplink transmission to the network entity based on the COT initiated by the UE.

17. An apparatus for wireless communications at a network entity, comprising one or more processors and at least one memory coupled with the one or more processors, the one or more processors configured to cause the network entity to:

transmit to a user equipment (UE), a downlink control information (DCI) that schedules at least one uplink transmission from the UE;

determine, based on an indication in the DCI, whether the at least one uplink transmission is based on a channel occupancy time (COT) initiated by the UE or a COT initiated by the network entity; and receive the at least one uplink transmission from the UE in accordance with the determination, wherein the indication in the DCI comprises a channel access priority class (CAPC) field for listen-before-talk (LBT) type indication, wherein the CAPC field for LBT type indication uses a first channel access type (CAT1) to indicate the COT initiated by the UE and a second channel access type (CAT2) to indicate the COT initiated by the network entity.

18. The apparatus of claim 17, wherein the DCI comprises DCI format 0_0, DCI format 1_0, DCI format 0_1, DCI format 1_1, DCI format 0_2, or DCI format 1_2.

19. The apparatus of claim 18, wherein the indication in the DCI comprises a channel access priority class (CAPC) field, wherein the CAPC field uses a first index to indicate the COT initiated by the UE and a second index to indicate the COT initiated by the network entity.

20. The apparatus of claim 18, wherein the indication in the DCI comprises a field using a first index to indicate the COT initiated by the UE and a second index to indicate the COT initiated by the network entity when the DCI does not include a channel access priority class (CAPC) field.

21. The apparatus of claim 17, wherein the indication in the DCI comprises a priority indicator using a first value to indicate the COT initiated by the UE and a second value to indicate the COT initiated by the network entity.

22. The apparatus of claim 17, wherein the indication in the DCI comprises a COT initiator indicator field using a first value to indicate the COT initiated by the UE and a second value to indicate the COT initiated by the network entity.

23. The apparatus of claim 22, wherein a presence of the COT initiator indicator field in the DCI is configurable by radio resource control (RRC).

24. The apparatus of claim 22, wherein the one or more processors are configured to cause the apparatus to:

upon determining the first value in the COT initiator indicator field, align the at least one uplink transmission with a starting point of a fixed frame period (FFP) for transmitting the at least one uplink transmission based on the COT initiated by the UE; and upon determining the second value in the COT initiator indicator field, transmit the at least one uplink transmission based on the COT initiated by the network entity.

25. The apparatus of claim 17, wherein the determine further comprises determine, based on a rule, whether the at least one uplink transmission is based on the COT initiated by the UE or the COT initiated by the network entity.

26. The apparatus of claim 25, wherein the rule comprises a pre-coded set of instructions for the UE to initiate the COT applicable to uplink transmissions including at least one of: scheduling request, physical uplink control channel (PUCCH), sounding reference signal (SRS), or physical uplink shared channel (PUSCH).

27. The apparatus of claim 25, wherein the rule comprises a configuration by a radio resource control (RRC) for the UE to initiate the COT applicable to uplink transmissions including at least one of: scheduling request, physical uplink control channel (PUCCH), sounding reference signal (SRS), or physical uplink shared channel (PUSCH).

28. The apparatus of claim 25, wherein the rule is provided by a media access control (MAC) control element (CE) for indicating the UE to initiate the COT applicable to uplink transmissions including at least one of: scheduling request, physical uplink control channel (PUCCH), sounding reference signal (SRS), or physical uplink shared channel (PUSCH).

29. A method for wireless communications at a user equipment (UE), comprising:

receiving from a network entity, a downlink control information (DCI) that schedules at least one uplink transmissions from the UE;

determining, based on an indication in the DCI, whether the at least one uplink transmission is based on a channel occupancy time (COT) initiated by the UE or a COT initiated by the network entity; and transmitting the at least one uplink transmission in accordance with the determination, wherein the indication in the DCI comprises a channel access priority class (CAPC) field for listen-before-talk (LBT) type indication, wherein the CAPC field for LBT type indication uses a first channel access type (CAT1) to indicate the COT initiated by the UE and a second channel access type (CAT2) to indicate the COT initiated by the network entity.

30. A method for wireless communications at a network entity, comprising:

transmitting to a user equipment (UE), a downlink control information (DCI) that schedules at least one uplink transmission from the UE;

determining, based on an indication in the DCI, whether the at least one uplink transmission is based on a channel occupancy time (COT) initiated by the UE or a COT initiated by the network entity; and receiving the at least one uplink transmission from the UE in accordance with the determination, wherein the indication in the DCI comprises a channel access priority class (CAPC) field for listen-before-talk (LBT) type indication, wherein the CAPC field for LBT type indication uses a first channel access type (CAT1) to indicate the COT initiated by the UE and a second channel access type (CAT2) to indicate the COT initiated by the network entity.

* * * * *